(12) United States Patent
Tanaka et al.

(10) Patent No.: US 10,322,968 B2
(45) Date of Patent: Jun. 18, 2019

(54) DISPERSANT COMPOSITION FOR HYDRAULIC COMPOSITION

(71) Applicant: KAO CORPORATION, Tokyo (JP)

(72) Inventors: Shunya Tanaka, Wakayama (JP); Masaaki Shimoda, Wakayama (JP); Kazuya Saida, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/563,174

(22) PCT Filed: Mar. 29, 2016

(86) PCT No.: PCT/JP2016/060052
§ 371 (c)(1),
(2) Date: Sep. 29, 2017

(87) PCT Pub. No.: WO2016/158921
PCT Pub. Date: Oct. 6, 2016

(65) Prior Publication Data
US 2018/0086669 A1    Mar. 29, 2018

(30) Foreign Application Priority Data

Mar. 31, 2015  (JP) ................................. 2015-073277

(51) Int. Cl.
| | | |
|---|---|---|
| *C04B 24/22* | (2006.01) | |
| *C04B 24/08* | (2006.01) | |
| *C04B 24/26* | (2006.01) | |
| *C04B 24/32* | (2006.01) | |
| *C04B 28/02* | (2006.01) | |
| *C08L 55/00* | (2006.01) | |
| *C08L 71/02* | (2006.01) | |
| *C04B 24/12* | (2006.01) | |
| C04B 103/40 | (2006.01) | |

(52) U.S. Cl.
CPC ............ *C04B 24/226* (2013.01); *C04B 24/08* (2013.01); *C04B 24/122* (2013.01); *C04B 24/22* (2013.01); *C04B 24/26* (2013.01); *C04B 24/2611* (2013.01); *C04B 24/32* (2013.01); *C04B 28/02* (2013.01); *C08L 55/00* (2013.01); *C08L 71/02* (2013.01); *C04B 2103/408* (2013.01)

(58) Field of Classification Search
CPC . C04B 24/226; C04B 24/32; C04B 2103/408; C04B 24/08; C04B 24/122; C04B 24/2611
USPC .......................................................... 524/5
See application file for complete search history.

(56) References Cited

U.S. PATENT DOCUMENTS

| | | | |
|---|---|---|---|
| 5,661,206 A | * | 8/1997 | Tanaka ................ C04B 24/2647 524/376 |
| 8,344,084 B2 | | 1/2013 | Bichler et al. |
| 2004/0204517 A1 | | 10/2004 | Yamashita et al. |
| 2004/0211342 A1 | | 10/2004 | Sprouts et al. |
| 2006/0293417 A1 | | 12/2006 | Taniguchi et al. |
| 2008/0108732 A1 | | 5/2008 | Wieland et al. |

FOREIGN PATENT DOCUMENTS

| | | | |
|---|---|---|---|
| JP | 60-11255 A | | 1/1985 |
| JP | 61697456 | * | 9/1986 |
| JP | 62003060 | * | 1/1987 |
| JP | 4-119955 A | | 4/1992 |
| JP | 7-157348 A | | 6/1995 |
| JP | 9-328345 A | | 12/1997 |
| JP | 2774445 B2 | | 7/1998 |
| JP | 2003-321264 A | | 11/2003 |
| JP | 2006-168305 A | | 6/2006 |
| JP | 2006-169078 A | | 6/2006 |
| JP | 2007-210877 A | | 8/2007 |
| JP | 2008-517080 A | | 5/2008 |
| JP | 2011-207669 A | | 10/2011 |

OTHER PUBLICATIONS

Extended European Search Report, dated Oct. 31, 2018, for European Application No. 16772802.1.
English translation of the International Preliminary Report on Patentability and Written Opinion of the International Searching Authority (Forms PCT/IB/373 and PCT/ISA/237) issued in International Application No. PCT/JP2016/060052 dated Oct. 3, 2017.
Chemistry Dictionary (including a partial English translation), 1st Edition, 7th Issue, published by Tokyo Kagaku Dojin, Co. Ltd., Apr. 1, 2003, pp. 844-845.
International Search Report for PCT/JP2016/060052 (PCT/ISA/210) dated Jun. 21, 2016.

* cited by examiner

*Primary Examiner* — Hui H Chin
(74) *Attorney, Agent, or Firm* — Birch, Stewart, Kolasch & Birch, LLP

(57) ABSTRACT

The present invention is a dispersant composition for a hydraulic composition, which includes (A) a high-molecular compound having a naphthalene ring-containing monomer unit, (B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group, and (C) a specific compound represented by the general formulas (C1) to (C4).

16 Claims, No Drawings

DISPERSANT COMPOSITION FOR HYDRAULIC COMPOSITION

FIELD OF THE INVENTION

The present invention relates to a dispersant composition for a hydraulic composition and a hydraulic composition.

BACKGROUND OF THE INVENTION

Dispersants for a hydraulic composition are chemical admixtures, and used for dispersing cement particles, thereby reducing a unit water quantity necessary for achieving a required slump and enhancing workability and the like of a hydraulic composition. Examples of conventionally-known dispersants include naphthalene-based dispersants such as a formaldehyde naphthalenesulfonate condensate, polycarboxylic acid-based dispersants such as a copolymer of a carboxylic acid and a monomer having an alkylene glycol chain, and melamine-based dispersants such as a melaminesulfonic acid-formaldehyde condensate.

Compared to polycarboxylic acid-based dispersants, naphthalene-based dispersants are characterized in that they have smaller fluctuations in exhibiting the fluidity in response to changes of materials or temperatures, and a hydraulic composition obtained thereby has a relatively low viscosity and they are easy to use in manufacturing a hydraulic composition.

Meanwhile, compared to naphthalene-based dispersants, polycarboxylic acid-based dispersants are characterized in that they can exhibit a good dispersibility to a hydraulic composition having a relatively low water/cement ratio. However, as regarded as a drawback in JP-A 2003-321264, JP-A 2007-210877 and JP-A 2011-207669, the effects of polycarboxylic acid-based dispersants are exhibited in a temperature dependent manner, and the effects such as the fluidity and the material separation resistance are likely to change under high temperature such as the summer season and under low temperature such as the winter season.

JP-A 2003-321264 discloses a hydraulic composition containing a polycarboxylic acid-based water reducing agent, cement and a metal salt of a specific carboxylic acid monomer.

JP-A 2007-210877 discloses a dispersant for a hydraulic composition, which contains a specific polycarboxylic acid-based polymer and a polymer having a specific phosphate group.

JP-A 2011-207669 discloses a hydraulic composition, which contains a hydraulic component, an inorganic impalpable powder, and a specific modified polycarboxylic acid-based fluidizing agent.

It is considered that when a naphthalene-based dispersant and a polycarboxylic acid-based dispersant are used in combination, the drawback on the temperature dependency is overcome while good dispersibility is exhibited to a hydraulic composition having a relatively low water/cement ratio. However, in actuality, as described in JP-A 2006-169078 and JP-A 2006-168305, combined use of a naphthalene-based dispersant and a polycarboxylic acid-based dispersant reduced the fluidity of a hydraulic composition, and a dispersant satisfying a practically usable level could not be obtained.

JP-A 2006-169078 discloses a water reducing agent for cement, which contains a polycarboxylic acid compound having 3 or more carboxyl groups per one molecule, a naphthalene sulfonic acid-based water reducing agent and a soluble acid calcium salt having a water solubility of 5 or more (at 25° C.).

JP-A 2006-168305 discloses a method for adding a water reducing agent for cement, which includes: kneading, with water, a hydraulic composition containing a polycarboxylic acid compound having 3 or more carboxyl groups per one molecule, an acid alkali metal salt, a calcium salt of which is water soluble, and cement; and then adding a sulfonic acid-based water reducing agent.

SUMMARY OF THE INVENTION

The present invention provides a dispersant composition for a hydraulic composition, which maintains a fluidity-imparting effect for the hydraulic composition, provides smaller temperature dependency to the fluidity-imparting effect, and imparts a good early strength to the hydraulic composition.

The present invention relates to a dispersant composition for a hydraulic composition, which contains:

(A) a high-molecular compound having a naphthalene ring-containing monomer unit;

(B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group; and (C) one or more compounds selected from a compound represented by the following general formula (C1), a compound represented by the following general formula (C2), a compound represented by the following general formula (C3), and a compound represented by the following general formula (C4),

[Chemical formula 1]

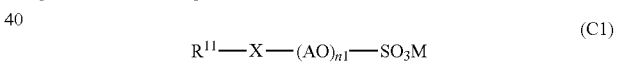

(C1)

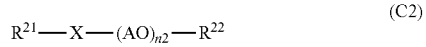

(C2)

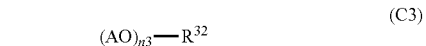

(C3)

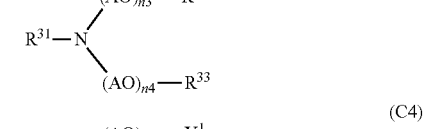

(C4)

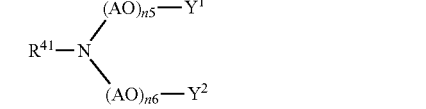

wherein:

$R^{11}$ is a hydrocarbon group, and a compound in the form of $R^{11}$—H has an HLB of 5.10 or less;

$R^{21}$ is a hydrocarbon group, and a compound in the form of $R^{21}$—H has an HLB of 5.10 or less;

$R^{31}$ is a hydrocarbon group, and a compound in the form of $R^{31}$—H has an HLB of 5.10 or less;

$R^{41}$ is a hydrocarbon group, and a compound in the form of $R^{41}$—H has an HLB of 5.10 or less;

$R^{22}$, $R^{32}$ and $R^{33}$ are the same or different and each represents a hydrogen atom or an alkyl group having a carbon number of 1 or more and 3 or less;

$Y^1$ and $Y^2$ are the same or different, each represents a hydrogen atom or $SO_3M$, and at least one of $Y^1$ and $Y^2$ is $SO_3M$;

AO is an alkyleneoxy group having a carbon number of 2 or more and 4 or less;

$n_1$ represents an average number of AO moles added and is 0 or more and 300 or less;

$n_2$ represents an average number of AO moles added and is 1 or more and 300 or less;

$n_3$ and $n_4$ are the same or different, and each represents an average number of AO moles added and is 0 or more, and a total of $n_3$ and $n_4$ is 1 or more and 300 or less;

$n_5$ and $n_6$ are the same or different; each represents an average number of AO moles added and is 0 or more; a total of $n_5$ and $n_6$ is 1 or more and 300 or less; when $n_5$ is 0, $Y^1$ is a hydrogen atom; and when $n_6$ is 0, $Y^2$ is a hydrogen atom;

X is O or COO; and

M is a counter ion.

Further, the present invention relates to a hydraulic composition, which contains:

a hydraulic powder;

water;

(A) a high-molecular compound having a naphthalene ring-containing monomer unit;

(B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group; and (C) one or more compounds selected from a compound represented by the following general formula (C1), a compound represented by the following general formula (C2), a compound represented by the following general formula (C3), and a compound represented by the following general formula (C4),

[Chemical formula 2]

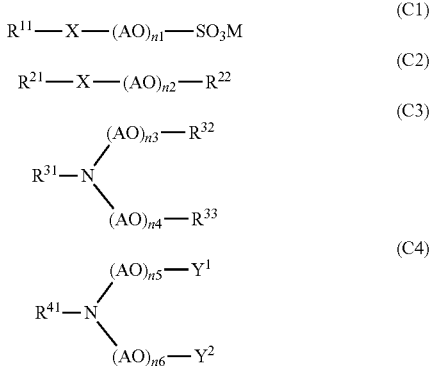

$$R^{11}-X-(AO)_{n1}-SO_3M \quad (C1)$$

$$R^{21}-X-(AO)_{n2}-R^{22} \quad (C2)$$

$$(C3)$$

$$(C4)$$

wherein:

$R^{11}$ is a hydrocarbon group, and a compound in the form of $R^{11}$—H has an HLB of 5.10 or less;

$R^{21}$ is a hydrocarbon group, and a compound in the form of $R^{21}$—H has an HLB of 5.10 or less;

$R^{31}$ is a hydrocarbon group, and a compound in the form of $R^{31}$—H has an HLB of 5.10 or less;

$R^{41}$ is a hydrocarbon group, and a compound in the form of $R^{41}$—H has an HLB of 5.10 or less;

$R^{22}$, $R^{32}$ and $R^{33}$ are the same or different and each represents a hydrogen atom or an alkyl group having a carbon number of 1 or more and 3 or less;

$Y^1$ and $Y^2$ are the same or different, each represents a hydrogen atom or $SO_3M$, and at least one of $Y^1$ and $Y^2$ is $SO_3M$;

AO is an alkyleneoxy group having a carbon number of 2 or more and 4 or less;

$n_1$ represents an average number of AO moles added and is 0 or more and 300 or less;

$n_2$ represents an average number of AO moles added and is 1 or more and 300 or less;

$n_3$ and $n_4$ are the same or different, and each represents an average number of AO moles added and is 0 or more, and a total of $n_3$ and $n_4$ is 1 or more and 300 or less;

$n_5$ and $n_6$ are the same or different; each represents an average number of AO moles added and is 0 or more; a total of $n_5$ and $n_6$ is 1 or more and 300 or less; when $n_5$ is 0, $Y^1$ is a hydrogen atom; and when $n_6$ is 0, $Y^2$ is a hydrogen atom;

X is O or COO; and

M is a counter ion.

Further, the present invention relates to a dispersant composition for an inorganic powder, which contains:

(A) a high-molecular compound having a naphthalene ring-containing monomer unit;

(B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group; and (C) one or more compounds selected from a compound represented by the following general formula (C1), a compound represented by the following general formula (C2), a compound represented by the following general formula (C3), and a compound represented by the following general formula (C4),

[Chemical formula 3]

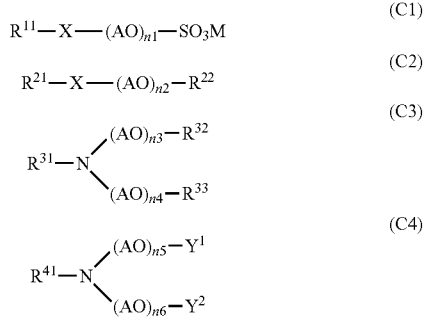

$$R^{11}-X-(AO)_{n1}-SO_3M \quad (C1)$$

$$R^{21}-X-(AO)_{n2}-R^{22} \quad (C2)$$

$$(C3)$$

$$(C4)$$

wherein:

$R^{11}$ is a hydrocarbon group, and a compound in the form of $R^{11}$—H has an HLB of 5.10 or less;

$R^{21}$ is a hydrocarbon group, and a compound in the form of $R^{21}$—H has an HLB of 5.10 or less;

$R^{31}$ is a hydrocarbon group, and a compound in the form of $R^{31}$—H has an HLB of 5.10 or less;

$R^{41}$ is a hydrocarbon group, and a compound in the form of $R^{41}$—H has an HLB of 5.10 or less;

$R^{22}$, $R^{32}$ and $R^{33}$ are the same or different and each represents a hydrogen atom or an alkyl group having a carbon number of 1 or more and 3 or less;

$Y^1$ and $Y^2$ are the same or different, each represents a hydrogen atom or $SO_3M$, and at least one of $Y^1$ and $Y^2$ is $SO_3M$;

AO is an alkyleneoxy group having a carbon number of 2 or more and 4 or less;

$n_1$ represents an average number of AO moles added and is 0 or more and 300 or less;

$n_2$ represents an average number of AO moles added and is 1 or more and 300 or less;

$n_3$ and $n_4$ are the same or different, and each represents an average number of AO moles added and is 0 or more, and a total of $n_3$ and $n_4$ is 1 or more and 300 or less;

$n_5$ and $n_6$ are the same or different; each represents an average number of AO moles added and is 0 or more; a total of $n_5$ and $n_6$ is 1 or more and 300 or less; when $n_5$ is 0, $Y^1$ is a hydrogen atom; and when $n_6$ is 0, $Y^2$ is a hydrogen atom;

X is O or COO; and

M is a counter ion.

Hereinafter, (A) a high-molecular compound having a naphthalene ring-containing monomer unit is referred to as component (A).

Further, (B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group is referred to as component (B).

Further, a compound represented by the general formula (C1), a compound represented by the general formula (C2), a compound represented by the general formula (C3), and a compound represented by the general formula (C4) are referred to as compound (C1), compound (C2), compound (C3) and compound (C4), respectively.

Further, compound (C1), compound (C2), compound (C3) and compound (C4) are referred to collectively as compound (C).

According to the present invention, there is provided a dispersant composition for a hydraulic composition, which maintains a fluidity-imparting effect for the hydraulic composition, provides smaller temperature dependency to the fluidity-imparting effect, and imparts a good early strength to the hydraulic composition.

DESCRIPTION OF EMBODIMENTS

[Dispersant Composition for Hydraulic Composition]

Component (A) can function as a naphthalene-based dispersant. Further, component (B) can function as a polycarboxylic acid-based dispersant. When component (B) has a phosphate group, a group that changes to a carboxylic acid group by hydrolysis, or a group that changes to a phosphate group by hydrolysis, it can also function in the same manner. Combined use of a naphthalene-based dispersant and a polycarboxylic acid-based dispersant increases the viscosity and reduces the dispersibility. It is believed that this is because a naphthalene ring of the naphthalene-based dispersant is associated with a polyalkyleneoxy group (AO chain) of the polycarboxylic acid-based dispersant, thereby allowing the dispersants to apparently have an increased molecular weight and to increase their viscosity; and this association inhibits adsorption to cement and decreases the dispersibility. Further, it is believed that when component (C) is used in combination, component (C) exhibits an interaction with a naphthalene ring thereby to eliminate or weaken the association between the naphthalene ring and the AO chain and prevent the viscosity from being increased. Then, it is believed that the naphthalene-based dispersant and the polycarboxylic acid-based dispersant are adsorbed to cement in respective different adsorption forms and they exhibit the dispersibility; and as a result, this provides such performance that cannot be obtained by single use of the naphthalene-based dispersant or the polycarboxylic acid-based dispersant. Component (C) is a compound that is soluble in a naphthalene-based dispersant aqueous solution and has a certain hydrophobic functional group, and thus it is believed that the interaction between component (C) and a naphthalene ring is caused by a balance between the hydrophilicity and the hydrophobicity.

<Component (A)>

Component (A) is a high-molecular compound having a naphthalene ring-containing monomer unit. Component (A) can be used as a dispersant for a hydraulic composition containing a hydraulic powder such as cement or gypsum.

Preferred examples of component (A) include formaldehyde naphthalenesulfonate condensates or salts thereof. Formaldehyde naphthalenesulfonate condensates or salts thereof are a condensate of naphthalenesulfonic acid and formaldehyde or salts thereof. A formaldehyde naphthalenesulfonate condensate may be co-condensated with an aromatic compound capable of co-condensating with a naphthalenesulfonate, as a monomer, for example, methylnaphthalene, ethylnaphthalene, butylnaphthalene, hydroxynaphthalene, naphthalene carboxylic acid, anthracene, phenol, cresol, creosote oil, tar, melamine, urea, sulfanilic acid and/or derivatives thereof as long as it does not impair the performance.

Examples of formaldehyde naphthalenesulfonate condensates or salts thereof to be used include commercially available products such as Mighty 150, Demol N, Demol RN, Demol MS, Demol SN-B, and Demol SS-L (all manufactured by Kao Corporation); and Cellflow 120, Lavelin FD-40, and Lavelin FM-45 (all manufactured by DKS Co., Ltd.).

The formaldehyde naphthalenesulfonate condensate or the salt thereof has, from the viewpoint of fluidity enhancement of a hydraulic composition, a weight average molecular weight of preferably 200,000 or less, more preferably 100,000 or less, further preferably 80,000 or less, further more preferably 50,000 or less, and further more preferably 30,000 or less. The formaldehyde naphthalenesulfonate condensate or the salt thereof has, from the viewpoint of fluidity enhancement of a hydraulic composition, a weight average molecular weight of preferably 1,000 or more, more preferably 3,000 or more, further preferably 4,000 or more, and further more preferably 5,000 or more. The formaldehyde naphthalenesulfonate condensate may be in an acidic state or a neutralized product.

The molecular weight of a formaldehyde naphthalenesulfonate condensate or a salt thereof can be measured using a gel permeation chromatography under the following conditions.

[GPC Condition]

Column: G4000SWXL+G2000SWXL (Tosoh Corporation)

Eluent: 30 mM $CH_3COONa/CH_3CN=6/4$

Flow rate: 0.7 ml/min

Detection: UV 280 nm

Sample size: 0.2 mg/ml

Standard substance: in terms of sodium polystyrene sulfonate (monodispersed sodium polystyrene sulfonate: molecular weight, 206, 1800, 4000, 8000, 18000, 35000, 88000, 780000) manufactured by Nishio Kogyo Kabushiki Kaisha Detector: UV-8020 (Tosoh Corporation)

A method for manufacturing a formaldehyde naphthalenesulfonate condensate or a salt thereof includes, for example, a method for obtaining a condensate by condensation reaction of a naphthalenesulfonate with formaldehyde. The condensate may be neutralized. Further, a water insoluble substance generated as a by-product of neutralization may be removed. Specifically, in order to obtain a naphthalenesulfonate, 1.2 to 1.4 mol of sulfuric acid is used relative to 1 mol of naphthalene and reacted with each other for 2 to 5 hours at 150° C. to 165° C., so that a sulfonated product is obtained. Next, formalin is added dropwise at 85° C. to 95° C. for 3 to 6 hours to provide 0.95 to 0.99 mol of formaldehyde relative to 1 mol of the sulfonated product, and condensation reaction is conducted at 95° C. to 105° C. after the dropwise addition. Further, an aqueous solution of the obtained condensate has a high acidity. Thus, from the viewpoint of preventing metallic corrosion of a storage tank or the like, water and a neutralizer are added to the obtained condensate and they may be subjected to neutralizing process at 80° C. to 95° C. It is preferred that the 1.0 to 1.1 molar equivalent of neutralizer be added to the naphthalenesulfonate and unreacted sulfuric acid. Further, as a method for removing a water insoluble product generated by neutralization, separation by filtration is preferred. Through these processes, an aqueous solution of a water soluble salt of formaldehyde naphthalenesulfonate condensate is obtained. This aqueous solution can be used as-is as an aqueous solution of component (A). Further, if needed, the aqueous solution is dried and powdered, and a powdered salt of formaldehyde naphthalenesulfonate condensate can be obtained, and this may be used as component (A). Drying and reduction to powder can be conducted by spray drying, drum drying, freeze-drying or the like.

<Component B>

Component (B) is a polymer having a weight average molecular weight of 1,000 or more and 1,000,000 or less, and having a monomer unit having a group selected from carboxylic acid groups, phosphate groups, groups that change to a carboxylic acid group by hydrolysis, and groups that change to a phosphate group by hydrolysis, and a monomer unit having an alkyleneoxy group.

A polymer is a compound obtained by addition polymerization or condensation polymerization. Examples of the addition polymerization include methods for reacting monomers having an unsaturated bond with each other, such as radical polymerization and ionic polymerization. Examples of the condensation polymerization include addition condensation by aldehydes, typified by formaldehyde condensation of an aromatic compound.

The carboxylic acid group for component (B) is a group represented by —COOM$^0$ (M$^0$ represents a counter ion). The carboxylic acid group is a group selected from a carboxy group and a salt form of a carboxy group.

Further, examples of the group for component (B) that changes to a carboxylic acid group by hydrolysis include carboxylic acid ester groups. A carboxylic acid ester group has an ester structure of —COOR (R is a hydrocarbon group, preferably an alkyl group or a hydroxyalkyl group having a carbon number of 1 or more and 12 or less), and a carboxylic acid group generated by hydrolysis remains in the structure of component (B). A group such as a carboxylic acid ester group that changes to a carboxylic acid group by hydrolysis is, so to speak, a group having a precursor structure of a carboxylic acid group. Polymerization of a monomer having a carboxylic acid ester group introduces a carboxylic acid ester group into a polymer of component (B).

A group that changes to a carboxylic acid group by hydrolysis is preferred from the viewpoint of the early strength. Further, a group that changes to a carboxylic acid group by hydrolysis is preferred from the viewpoint of the fluidity retentivity.

Further, the phosphate group for component (B) is a group represented by —OPO(OM$^1$)(OM$^2$) (M$^1$ and M$^2$ are the same or different and each represents a counter ion). The phosphate group is a group selected from a phosphate group and a salt form of a phosphate group.

In the above, M$^0$, M$^1$ and M$^2$ are, for example, a hydrogen ion, an alkali metal ion, an alkaline earth metal ion (½ atom), an ammonium ion, and an amine.

Further, examples of the group for component (B) that changes to a phosphate group by hydrolysis include phosphate ester group. A phosphate ester group has a structure represented by the following formula.

[Chemical formula 4]

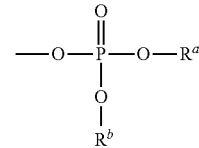

wherein R$^a$ and R$^b$ each represent a hydrocarbon group, preferably an alkyl group or a hydroxyalkyl group having a carbon number of 1 or more and 12 or less.

In the case of a phosphate ester group, a phosphate group generated by hydrolysis remains in a structure of component (B). A group such as a phosphate ester group that changes to a phosphate group by hydrolysis is, so to speak, a group having a precursor structure of a phosphate group. Polymerization of a monomer having a phosphate ester group introduces a phosphate ester group into a polymer of component (B).

A group that changes to a phosphate group by hydrolysis is preferred from the viewpoint of the early strength. Further, a group that changes to a phosphate group by hydrolysis is preferred from the viewpoint of the fluidity retentivity.

Component (B) may be a polymer having a weight average molecular weight of 1,000 or more and 1,000,000 or less, and having a monomer unit having a group selected from a carboxylic acid group, a phosphate group, a carboxylic acid ester group and a phosphate ester group; and a monomer unit having an alkyleneoxy group.

The alkyleneoxy group for component (B) is, for example, an ethyleneoxy group and a propyleneoxy group. These are preferably one obtained by addition polymerization of 2 moles or more of alkyleneoxy group such as a polyethyleneoxy group or a polypropyleneoxy group.

Component (B) is preferably a polymer selected from a polymer containing a monomer unit having a carboxylic acid group, and a polymer containing a monomer unit having a carboxylic acid group and a monomer unit having a phosphate group.

Examples of component (B) include: an addition polymer of a phosphate compound and/or a carboxylic acid compound having an unsaturated bond and a compound having a monomer unit having an alkyleneoxy group with an unsaturated bond; and a condensate of formaldehyde and a compound having a monomer unit with a group selected from a carboxylic acid group and a phosphate group and a monomer unit having an alkyleneoxy group.

Component (B) has a weight average molecular weight of 1,000 or more and 1,000,000 or less; from the viewpoint of the fluidity improvement of a hydraulic composition, the weight average molecular weight is preferably 5,000 or more, more preferably 10,000 or more, and further preferably 30,000 or more; and preferably 500,000 or less, further preferably 150,000 or less, and further more preferably 100,000 or less.

Examples of component (B) include:

(1) a copolymer obtained by copolymerizing alkoxypolyalkylene glycol mono(meth)acrylate, and one or more selected from (meth)acrylic acid, (meth)acrylic acid ester having a carbon number of 1 or more and 3 or less and optionally having a hydroxyl group, and a phosphate ester having an unsaturated group; and (2) a copolymer obtained by copolymerizing an ether compound of polyalkylene glycol and an unsaturated alcohol, and one or more selected from dicarboxylic acids and dicarboxylic acid anhydrides.

In the above, (meth)acrylate signifies acrylate or methacrylate; and (meth)acrylic acid signifies acrylic acid or methacrylic acid.

As the monomer unit having a carboxylic acid group, exemplified is a monomer unit derived from one or more monomers selected from a monocarboxylic acid having an addition-polymerizable unsaturated bond and a dicarboxylic acid having an addition-polymerizable unsaturated bond. Examples thereof include a monomer unit derived from one or more monomers selected from acrylic acid, methacrylic acid, crotonic acid, maleic acid, fumaric acid, itaconic acid, and citraconic acid, and a monomer unit derived from one or more monomers selected from methacrylic acid and acrylic acid is preferred. The monomer unit may be a monomer unit having a monomer of an anhydrous compound such as maleic anhydride or a half ester such as maleic acid monoester.

As the monomer unit having a group that changes to a carboxylic acid group by hydrolysis, exemplified is a monomer unit derived from a monomer having a carboxylic acid ester group. For example, a monomer unit derived from one or more monomers selected from 2-hydroxyethyl acrylate, methyl acrylate and ethyl acrylate is preferred, and a monomer unit derived from 2-hydroxyethyl acrylate is more preferred.

As the monomer unit having a group selected from phosphate groups, exemplified is a monomer unit derived from one or more monomers selected from phosphate compounds having an addition-polymerizable unsaturated bond and phosphate compounds having a condensation-polymerizable aromatic functional group. Examples thereof include a monomer unit derived from one or more monomers selected from di[(2-hydroxyethyl) methacrylic acid] phosphate ester, di[(2-hydroxyethyl) acrylic acid] phosphate ester, mono(2-hydroxyethyl)methacrylic acid phosphate ester, mono(2-hydroxyethyl)acrylic acid phosphate ester, polyalkylene glycol mono(meth)acrylate acid phosphate ester, and phenoxyethanol phosphate. Preferred is a monomer unit derived from one or more monomers selected from di[(2-hydroxyethyl) methacrylic acid] phosphate ester, mono(2-hydroxyethyl)methacrylic acid phosphate ester, and phenoxyethanol phosphate. Further, the monomer unit may be an alkali metal salt, an alkaline earth metal salt, an ammonium salt or an amine salt of any one or more of the above.

As the monomer unit having a group that changes to a phosphate group by hydrolysis, exemplified is a monomer unit derived from a monomer having a phosphate ester group. For example, a monomer unit derived from one or more monomers selected from dimethyl monohydroxyethyl methacrylate phosphate ester, diethyl monohydroxyethyl methacrylate phosphate ester, and dihydroxyethyl monohydroxyethyl methacrylate phosphate ester is preferred, and a monomer unit derived from dihydroxyethyl monohydroxyethyl methacrylate phosphate ester is more preferred.

As the monomer unit having an alkyleneoxy group, exemplified is a monomer unit derived from a compound having an addition-polymerizable unsaturated bond and an alkyleneoxy group. Examples thereof include a monomer unit derived from one or more monomers selected from alkoxypolyalkylene glycol mono(meth)acrylate, and an ether compound of polyalkylene glycol and an unsaturated alcohol. Specific examples of the monomer unit having an alkyleneoxy group include a monomer unit derived from a monomer selected from: an esterified product of an acrylic acid or methacrylic acid, and a polyalkylene glycol with one alkyl-blocked end such as methoxypolyethylene glycol, methoxypolyethylene polypropylene glycol, ethoxypolyethylene glycol, ethoxypolyethylene polypropylene glycol, propoxypolyethylene glycol, propoxypolyethylene polypropylene glycol; an adduct of ethyleneoxide and/or propylene oxide of allyl alcohol; an adduct of ethyleneoxide and/or propylene oxide of isoprenol; an adduct of ethyleneoxide and/or propylene oxide of vinyl alcohol; an adduct of ethyleneoxide and/or propylene oxide of acrylic acid; and an adduct of ethyleneoxide and/or propylene oxide of methacrylic acid.

The monomer unit of component (B) having an alkyleneoxy group has an average number of moles of added alkyleneoxy group per monomer unit of, from the viewpoint of the dispersibility improvement, preferably 5 or more, more preferably 7 or more, and further preferably 20 or more; and preferably 150 or less, and more preferably 130 or less.

Further, as the monomer unit having an alkyleneoxy group, preferred is a monomer unit derived from a monomer represented by the following general formula (B1).

[Chemical formula 5]

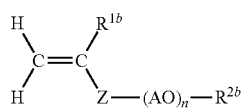

(B1)

wherein $R^{1b}$ represents a hydrogen atom or a methyl group; AO is an alkyleneoxy group having 2 or 3 carbon atoms, n is an average number of AO moles added and represents a number of 5 or more and 150 or less; Z represents an ether group (—O—) or an ester group (—COO—); and $R^{2b}$ represents a hydrogen atom or an alkyl group having a carbon number of 1 or more and 3 or less.

Specific examples of component (B) are shown below.

(b1) Polymer Containing, as Constituent Monomers, Methacrylic Acid and Methoxy Polyethylene Glycol Monomethacrylate In this polymer, from the viewpoint of the dispersibility improvement, methacrylic acid preferably constitutes 40 mol % or more and 90 mol % or less of the constituent monomers. Further, in the polymer, from the viewpoint of the dispersibility improvement, methoxy polyethylene glycol monomethacrylate preferably constitutes 10 mol % or more and 60 mol % or less of the constituent monomers. Further, from the viewpoint of the dispersibility improvement, the polymer preferably has a weight average molecular weight of 10,000 or more and 100,000 or less. The weight average molecular weight can be measured by gel permeation chromatography (reference material: monodispersed polyethylene glycol having a known molecular weight).

(b2) Formaldehyde Condensation Polymer Containing, as Constituent Monomers, Polyoxyethylene Monophenyl Ether and Phenoxyethanol Phosphate In the polymer, from the viewpoint of the dispersibility improvement, polyoxyethylene monophenyl ether preferably constitutes 10 mol % or more and 70 mol % or less of the constituent monomers. Further, in the polymer, from the viewpoint of the dispersibility improvement, phenoxyethanol phosphate preferably constitutes 30 mol % or more and 90 mol % or less of the constituent monomers. Further, from the viewpoint of the dispersibility improvement, the polymer preferably has a weight average molecular weight of 5,000 or more and 100,000 or less. The weight average molecular weight can be measured by gel permeation chromatography (reference material: monodispersed polyethylene glycol having a known molecular weight).

(b3) Polymer Containing, as Constituent Monomers, Methacrylic Acid and 2-hydroxyethyl Acrylate In the polymer, from the viewpoint of the dispersibility improvement, methacrylic acid preferably constitutes 45 mol % or more and 95 mol % or less of the constituent monomers. Further, in the polymer, from the viewpoint of the dispersibility improvement, 2-hydroxyethyl acrylate preferably constitutes 5 mol % or more and 55 mol % or less of the constituent monomers. Further, from the viewpoint of the dispersibility improvement, the polymer preferably has a weight average molecular weight of 5,000 or more and 100,000 or less. The weight average molecular weight can be measured by gel permeation chromatography (reference material: monodispersed polyethylene glycol having a known molecular weight).

<Component (C)>

Compound (C1) is a compound represented by the general formula (C1).

In the general formula (C1), $R^{11}$ is a hydrocarbon group which provides an HLB of a compound in the form of $R^{11}$—H of 5.10 or less. $R^{11}$—H has an HLB of preferably 3.21 or less, more preferably 1.31 or less, further preferably −0.59 or less; and preferably −3.46 or more, more preferably −2.51 or more, and further preferably −1.56 or more. The HLB of $R^{11}$—H is based on Davies' method.

$R^{11}$ in the general formula (C1) is a hydrocarbon group. This hydrocarbon group includes a substituent-containing hydrocarbon group.

A substituent is an atom or an atomic group, which is introduced instead of a hydrogen atom in a most basic organic compound (KAGAKU JITEN (Chemistry Dictionary), 1st edition, 7th issue, Tokyo Kagaku Dojin Kabushiki Kaisha, Apr. 1, 2003). A substituent-containing hydrocarbon may be a derivative of the hydrocarbon. A derivative is a compound, wherein when a certain hydrocarbon is considered as a parent body, a modification that does not largely change a structure or properties of the parent body, such as introduction of a functional group, oxidation, reduction or atom substitution, is made.

Examples of hydrocarbon groups of $R^{11}$ include an alkyl group, an alkenyl group, an aralkyl group, an aryl group, and an aryl group having a substituent (hereinafter, referred to as substituted aryl group). The hydrocarbon group of $R^{11}$ is preferably a group selected from an alkyl group, an alkenyl group and a substituted aryl group.

The alkyl group of $R^{11}$ is preferably an aliphatic alkyl group, more preferably a linear aliphatic alkyl group, and further preferably a linear primary aliphatic alkyl group.

The alkenyl group of $R^{11}$ is preferably an aliphatic alkenyl group, more preferably a linear aliphatic alkenyl group, and further preferably a linear primary aliphatic alkenyl group.

The term "primary" used herein for an alkyl group or an alkenyl group means that, among carbon atoms of the alkyl or alkenyl group, a carbon atom to be coupled to other group is a primary carbon atom. It means that, for example, among carbon atoms of an alkyl group or alkenyl group of $R^{11}$, a carbon atom to be coupled to X is a primary carbon atom.

The substituted aryl group for $R^{11}$ is an aryl group wherein a hydrogen atom of an aromatic ring is substituted by a substituent, and examples thereof include an aryl group wherein a hydrogen atom of an aromatic ring is substituted by a hydrocarbon group. Examples of the substituted aryl group include substituted aryl groups wherein one, two or three hydrogen atoms of an aromatic ring are substituted by a substituent such as a hydrocarbon group. The aryl group for the substituted aryl group is preferably a phenyl group. Further, substituted aryl group having 13 or more and 30 or less carbon atoms are exemplified.

Examples of the substituted aryl group include: groups selected from an alkyl group-substituted phenyl group having a carbon number of preferably 1 or more and further preferably 2 or more, and preferably 10 or less and further preferably 8 or less; a benzyl group-substituted phenyl group; and a styrenated phenyl group. As the substituted aryl group, exemplified is a group selected from a benzyl group-substituted phenyl group and a styrenated phenyl group.

The substituted aryl group is preferably a group selected from a monobenzyl phenyl group, a dibenzyl phenyl group, a tribenzyl phenyl group, a monostyrenated phenyl group, a distyrenated phenyl group, a tristyrenated phenyl group, an octyl phenyl group and a nonyl phenyl group; more preferably a group selected from a tribenzyl phenyl group and a distyrenated phenyl group.

From an economic viewpoint, $R^{11}$ is preferably an alkyl group.

From the viewpoint of the easy solubility in water, $R^{11}$ is preferably an alkenyl group.

From the viewpoint of the strength development of a hardened body and from the viewpoint of preventing foaming of a hydraulic composition, $R^{11}$ is preferably a substituted aryl group.

In the general formula (C1), specific examples of R11 include hydrocarbon groups having a carbon number of 4 or more and 30 or less.

The carbon number of $R^{11}$ is preferably 8 or more, more preferably 12 or more, and further preferably 16 or more; and preferably 22 or less, more preferably 20 or less, and further preferably 18 or less.

Specific examples of $R^{11}$ include groups selected from a hydrocarbon group having a carbon number of preferably 8 or more, further preferably 10 or more, and further more preferably 16 or more; and preferably 22 or less, and further preferably 20 or less; and a hydrocarbon group wherein a hydrogen atom thereof is substituted by a substituent.

Other specific examples of $R^{11}$ include groups selected from an alkyl group or an alkenyl group having a carbon number of preferably 8 or more, further preferably 10 or more, further more preferably 16 or more, and preferably 22 or less, and further preferably 20 or less, and a group wherein a hydrogen atom of the alkyl or alkenyl group is substituted by a substituent; and a hydrocarbon group-substituted aryl group or a substituted aryl group having a carbon number of 13 or more and 30 or less.

Other specific examples of $R^{11}$ include groups selected from:

an alkyl group, preferably an aliphatic alkyl group, more preferably a linear aliphatic alkyl group, and further preferably a linear primary aliphatic alkyl group, having a carbon number of preferably 8 or more, further preferably 10 or more, further more preferably 16 or more, and preferably 22 or less, further preferably 20 or less; and an alkenyl group, preferably an aliphatic alkenyl group, more preferably a linear aliphatic alkenyl group, and further preferably a linear primary aliphatic alkenyl group, having a carbon number of preferably 8 or more, further preferably 10 or more, further more preferably 16 or more, and preferably 22 or less, and further preferably 20 or less.

Further, other specific examples of $R^{11}$ include: an alkyl group-substituted phenyl group having a carbon number of preferably 1 or more and further preferably 2 or more, and preferably 10 or less and further preferably 8 or less; a benzyl group-substituted phenyl group; and a styrenated phenyl group. These groups specifically include groups selected from a benzyl group-substituted phenyl group having a carbon number of 13 or more and 27 or less, and a styrenated phenyl group having a carbon number of 14 or more and 30 or less.

More specific examples of $R^{11}$ include groups selected from a decyl group, a lauryl group, a myristyl group, a palmityl group, a stearyl group, a behenyl group, an isostearyl group, an oleyl group, a tribenzyl phenyl group, a distyrenated phenyl group and a tristyrenated phenyl group. From the viewpoint of the fluidity improvement of a hydraulic composition, preferred is a group selected from a lauryl group, a myristyl group, a palmityl group, a stearyl group, a behenyl group, an isostearyl group, an oleyl group, a tribenzyl phenyl group and a distyrenated phenyl group. More preferred is a group selected from a lauryl group, a myristyl group, a palmityl group, a stearyl group, an oleyl group, a tribenzyl phenyl group and a distyrenated phenyl group.

In the general formula (C1), X is O or COO, preferably O.

In the general formula (C1), AO is an alkyleneoxy group having 2 or more and 4 or less carbon atoms, preferably an alkyleneoxy group having 2 or 3 carbon atoms. AO preferably includes an alkyleneoxy group having 2 carbon atoms.

In the general formula (C1), n1 represents an average number of AO moles added and, from the viewpoint of the cement dispersibility, it is 0 or more and 300 or less. From the viewpoint of fluidity enhancement of a hydraulic composition, n1 is preferably 1 or more, more preferably 10 or more, further preferably 20 or more, further more preferably 30 or more, further more preferably 40 or more, and further more preferably 50 or more; and from the viewpoint of easy occurrence of interaction with component (A) and from an economic viewpoint, preferably 200 or less, more preferably 150 or less, and further preferably 100 or less.

In the general formula (C1), M represents a counter ion such as a hydrogen ion, an alkali metal ion, an alkaline earth metal ion (½ atom) and an ammonium ion.

From the viewpoint of the easiness of manufacturing a compound, M is preferably an ammonium ion.

From the viewpoint of the offensive smell of a compound, M is preferably an alkali metal ion, more preferably an alkali metal ion selected from a sodium ion and a potassium ion.

Examples of compound (C1) include polyoxyethylene alkenyl ether sulfuric esters such as polyoxyethylene oleyl ether sulfuric ester, or salts thereof; and polyoxyethylene substituted aryl ether sulfuric esters such as polyoxyethylene distyrenated phenyl ether sulfuric ester, or salts thereof.

[(C2)]

Compound (C2) is a compound represented by the general formula (C2).

In the general formula (C2), $R^{21}$ is a hydrocarbon group which provides an HLB of a compound in the form of $R^{21}$—H of 5.10 or less. $R^{21}$—H has an HLB of preferably 3.21 or less, more preferably 1.31 or less; and preferably −3.46 or more, more preferably −2.51 or more, further preferably −1.56 or more, and further more preferably −0.60 or more. The HLB of $R^{21}$—H is based on Davies' method.

$R^{21}$ in the general formula (C2) is a hydrocarbon group. This hydrocarbon group includes a substituent-containing hydrocarbon group.

A substituent is an atom or an atomic group, which is introduced instead of a hydrogen atom in a most basic organic compound (KAGAKU JITEN (Chemistry Dictionary), 1st edition, 7th issue, Tokyo Kagaku Dojin Kabushiki Kaisha, Apr. 1, 2003). A substituent-containing hydrocarbon may be a derivative of the hydrocarbon. A derivative is a compound, wherein when a certain hydrocarbon is considered as a parent body, a modification that does not largely change a structure or properties of the parent body, such as introduction of a functional group, oxidation, reduction or atom substitution, is made.

Examples of hydrocarbon groups for $R^{21}$ include an alkyl group, an alkenyl group, an aralkyl group, an aryl group, and an aryl group having a substituent (hereinafter, referred to as substituted aryl group). The hydrocarbon group for $R^{21}$ is preferably a group selected from alkyl groups, alkenyl groups and substituted aryl groups).

The alkyl group for $R^{21}$ is preferably an aliphatic alkyl group, more preferably a linear aliphatic alkyl group, and further preferably a linear primary aliphatic alkyl group.

The alkenyl group for $R^{21}$ is preferably an aliphatic alkenyl group, more preferably a linear aliphatic alkenyl group, and further preferably a linear primary aliphatic alkenyl group.

The substituted aryl group for $R^{21}$ is an aryl group wherein a hydrogen atom of an aromatic ring is substituted by a substituent, and examples thereof include an aryl group wherein a hydrogen atom of an aromatic ring is substituted by a hydrocarbon group. Examples of the substituted aryl group include substituted aryl groups wherein one, two or three hydrogen atoms of an aromatic ring are substituted by a substituent such as a hydrocarbon group. The aryl group for the substituted aryl group is preferably a phenyl group. Further, a substituted aryl group having 13 or more and 30 or less carbon atoms is exemplified.

Examples of the substituted aryl group include: groups selected from an alkyl group-substituted phenyl group having a carbon number of preferably 1 or more and further preferably 2 or more, and preferably 10 or less and further preferably 8 or less; a benzyl group-substituted phenyl group; and a styrenated phenyl group. As the substituted aryl group, exemplified is a group selected from a benzyl group-substituted phenyl group and a styrenated phenyl group.

The substituted aryl group is preferably a group selected from a monobenzyl phenyl group, a dibenzyl phenyl group, a tribenzyl phenyl group, a monostyrenated phenyl group, a distyrenated phenyl group, a tristyrenated phenyl group, an octyl phenyl group and a nonyl phenyl group; more preferably a group selected from a tribenzyl phenyl group and a distyrenated phenyl group.

From an economic viewpoint, $R^{21}$ is preferably an alkyl group.

From the viewpoint of the easy solubility in water, $R^{21}$ is preferably an alkenyl group.

From the viewpoint of the strength development of a hardened body and from the viewpoint of preventing foaming of a hydraulic composition, $R^{21}$ is preferably a substituted aryl group.

In the general formula (C2), specific examples of $R^{21}$ include hydrocarbon groups having a carbon number of 4 or more and 30 or less.

From the viewpoint of the dispersibility improvement, the carbon number of $R^{21}$ is preferably 8 or more, more preferably 12 or more, and further preferably 16 or more; and preferably 22 or less, more preferably 20 or less, and further preferably 18 or less.

Specific examples of $R^{21}$ include groups selected from a hydrocarbon group having a carbon number of preferably 10 or more, and further preferably 12 or more; and preferably 22 or less, and further preferably 20 or less; and a hydrocarbon group wherein a hydrogen atom thereof is substituted by a substituent.

Other specific examples of $R^{21}$ include groups selected from an alkyl group or an alkenyl group having a carbon number of preferably 10 or more, and further preferably 12 or more, and preferably 22 or less, and further preferably 20 or less, and a group wherein a hydrogen atom of the alkyl or alkenyl group is substituted by a substituent; and a hydrocarbon group-substituted aryl group, preferably a substituted aryl group having a carbon number of 13 or more and 30 or less.

Other specific examples of $R^{21}$ include groups selected from:

an alkyl group, preferably an aliphatic alkyl group, more preferably a linear aliphatic alkyl group, and further preferably a linear primary aliphatic alkyl group, having a carbon number of preferably 10 or more, further preferably 12 or more, and preferably 22 or less, further preferably 20 or less; and an alkenyl group, preferably an aliphatic alkenyl group, more preferably a linear aliphatic alkenyl group, and further preferably a linear primary aliphatic alkenyl group, having a carbon number of preferably 10 or more, further preferably 12 or more, and preferably 22 or less, and further preferably 20 or less.

Further, other specific examples of $R^{21}$ include: an alkyl group-substituted phenyl group having a carbon number of preferably 1 or more and further preferably 2 or more, and preferably 10 or less and further preferably 8 or less; a benzyl group-substituted phenyl group; and a styrenated phenyl group. These groups specifically include groups selected from a benzyl group-substituted phenyl group having a carbon number of 13 or more and 27 or less, and a styrenated phenyl group having a carbon number of 14 or more and 30 or less.

More specific examples of $R^{21}$ include groups selected from a decyl group, a lauryl group, a myristyl group, a palmityl group, a stearyl group, a behenyl group, an isostearyl group, an oleyl group, tribenzyl phenyl group, distyrenated phenyl group and tristyrenated phenyl group. From the viewpoint of the fluidity improvement of a hydraulic composition, preferred is a group selected from a lauryl group, a myristyl group, a palmityl group, a stearyl group, a behenyl group, an isostearyl group, an oleyl group, tribenzyl phenyl group and distyrenated phenyl group. More preferred is a group selected from a lauryl group, a myristyl group, a palmityl group, a stearyl group, an oleyl group, tribenzyl phenyl group and distyrenated phenyl group.

In the general formula (C2), X is O or COO, preferably O.

In the general formula (C2), AO is an alkyleneoxy group having 2 or more and 4 or less carbon atoms, preferably an alkyleneoxy group having 2 or 3 carbon atoms. AO preferably includes an alkyleneoxy group having 2 carbon atoms.

In the general formula (C2), n2 represents an average number of AO moles added and, from the viewpoint of the cement dispersibility, it is a number of from 1 to 300. From the viewpoint of fluidity enhancement of a hydraulic composition, n2 is preferably 5 or more, more preferably 9 or more, further preferably 12 or more, further more preferably 20 or more, and further more preferably 28 or more; and from the viewpoint of easy occurrence of interaction with component (A) and from an economic viewpoint, preferably 200 or less, more preferably 150 or less, further preferably 100 or less, further more preferably 60 or less, and further more preferably 35 or less.

In general formula (C2), $R^{22}$ is a hydrogen atom or an alkyl group having 1 or more and 3 or less carbon atoms, and preferably a hydrogen atom.

Examples of compound (C2) include polyoxyethylene alkyl ethers such as polyoxyethylene 2-ethyl hexyl ether, polyoxyethylene decyl ether, polyoxyethylene lauryl ether and polyoxyethylene oleyl ether, and polyoxyethylene alkenyl ethers. Further, examples thereof include polyoxyethylene alkyl esters such as polyoxyethylene monostearate. Further, examples thereof include polyoxyethylene substituted aryl ethers such as polyoxyethylene tribenzyl phenyl ether and polyoxyethylene distyrenated phenyl ether.

[(C3)]

Compound (C3) is a compound represented by the general formula (C3).

In the general formula (C3), $R^{31}$ is a hydrocarbon group which provides an HLB of a compound in the form of $R^{31}$—H of 5.10 or less. $R^{31}$—H has an HLB of preferably 3.21 or less, and more preferably 1.31 or less; and preferably −3.46 or more, more preferably −2.51 or more, further preferably −1.56 or more, further more preferably −0.60 or more. The HLB of $R^{31}$—H is based on Davies' method.

$R^{31}$ in the general formula (C3) is a hydrocarbon group. This hydrocarbon group includes a substituent-containing hydrocarbon group.

A substituent is an atom or an atomic group, which is introduced instead of a hydrogen atom in a most basic organic compound (KAGAKU JITEN (Chemistry Dictionary), 1st edition, 7th issue, Tokyo Kagaku Dojin Kabushiki Kaisha, Apr. 1, 2003). A substituent-containing hydrocarbon may be a derivative of the hydrocarbon. A derivative is a compound, wherein when a certain hydrocarbon is considered as a parent body, a modification that does not largely change a structure or properties of the parent body, such as introduction of a functional group, oxidation, reduction or atom substitution, is made.

Examples of hydrocarbon groups of $R^{31}$ include an alkyl group, an alkenyl group, an aralkyl group, an aryl group, and an aryl group having a substituent. Examples of the substituted aryl group include substituted aryl groups wherein one, two or three hydrogen atoms of an aromatic ring are substituted. The hydrocarbon group of $R^{31}$ is preferably a group selected from an alkyl group and an alkenyl group.

The alkyl group of $R^{31}$ is preferably an aliphatic alkyl group, more preferably a linear aliphatic alkyl group, and further preferably a linear primary aliphatic alkyl group.

The alkenyl group of $R^{31}$ is preferably an aliphatic alkenyl group, more preferably a linear aliphatic alkenyl group, and further preferably a linear primary aliphatic alkenyl group.

From an economic viewpoint, $R^{31}$ is preferably an alkyl group.

From the viewpoint of the easy solubility in water, $R^{31}$ is preferably an alkenyl group.

In the general formula (C3), specific examples of $R^{31}$ include hydrocarbon groups having a carbon number of 4 or more and 30 or less.

The carbon number of $R^{31}$ is selected from preferably 8 or more, more preferably 12 or more, and further preferably 16 or more; and preferably 22 or less, more preferably 20 or less, and further preferably 18 or less.

Specific examples of $R^{31}$ include groups selected from a hydrocarbon group having a carbon number of preferably 10 or more, and more preferably 12 or more; and preferably 27 or less, more preferably 26 or less, and further preferably 24 or less; and a hydrocarbon group wherein a hydrogen atom thereof is substituted by a substituent.

Other specific examples of $R^{31}$ include groups selected from an alkyl group or an alkenyl group having a carbon number of preferably 10 or more, more preferably 12 or more; and preferably 27 or less, more preferably 26 or less, and further preferably 24 or less; and a group wherein a hydrogen atom of the alkyl or alkenyl group is substituted by a substituent.

Other specific examples of $R^{31}$ include groups selected from: an alkyl group, preferably an aliphatic alkyl group, more preferably a linear aliphatic alkyl group, and further preferably a linear primary aliphatic alkyl group, having a carbon number of preferably 10 or more, and more preferably 12 or more; and preferably 27 or less, more preferably 26 or less, and further preferably 24 or less; and an alkenyl group, preferably an aliphatic alkenyl group, more preferably a linear aliphatic alkenyl group, and further preferably a linear primary aliphatic alkenyl group, having a carbon number of preferably 10 or more, and 12 or more; and preferably 27 or less, more preferably 26 or less and further preferably 24 or less.

More specific examples of $R^{31}$ include groups selected from a decyl group, a lauryl group, a myristyl group, a palmityl group, a stearyl group, a behenyl group, an isostearyl group, and an oleyl group. From the viewpoint of the fluidity improvement of a hydraulic composition, preferred is a group selected from a lauryl group, a myristyl group, a palmityl group, a stearyl group, a behenyl group, an isostearyl group, and an oleyl group; and more preferred is a group selected from a lauryl group, a myristyl group, a palmityl group, a stearyl group, and an oleyl group.

In the general formula (C3), AO is an alkyleneoxy group having 2 or more and 4 or less carbon atoms, preferably an alkyleneoxy group having 2 to 3 carbon atoms. AO preferably includes an alkyleneoxy group having 2 carbon atoms.

In the general formula (C3), n3 and n4 are the same or different, and each represents an average number of AO moles added and is 0 or more. From the viewpoint of the cement dispersibility, the total of n3 and n4 is 1 or more, preferably 20 or more, and more preferably 50 or more; and from an economic viewpoint, 300 or less, preferably 200 or less, and more preferably 150 or less, and further preferably 100 or less.

In the general formula (C3), $R^{32}$ and $R^{33}$ are the same or different, and each represents a hydrogen atom or an alkyl group having 1 or more and 3 or less carbon atoms. $R^{32}$ and $R^{33}$ are each preferably a hydrogen atom.

[(C4)]

Compound (C4) is a compound represented by the general formula (C4).

In the general formula (C4), $R^{41}$ is a hydrocarbon group which provides an HLB of a compound in the form of $R^{41}$—H of 5.10 or less. $R^{41}$—H has an HLB of preferably 3.21 or less, and more preferably 1.31 or less; and preferably −3.46 or more, more preferably −2.51 or more, further preferably −1.56 or more, and further more preferably −0.60 or more. The HLB of $R^{41}$—H is based on Davies' method.

$R^{41}$ in the general formula (C4) is a hydrocarbon group. This hydrocarbon group includes a substituent-containing hydrocarbon group.

A substituent is an atom or an atomic group, which is introduced instead of a hydrogen atom in a most basic organic compound (KAGAKU JITEN (Chemistry Dictionary), 1st edition, 7th issue, Tokyo Kagaku Dojin Kabushiki Kaisha, Apr. 1, 2003). A substituent-containing hydrocarbon may be a derivative of the hydrocarbon. A derivative is a compound, wherein when a certain hydrocarbon is considered as a parent body, a modification that does not largely change a structure or properties of the parent body, such as introduction of a functional group, oxidation, reduction or atom substitution, is made.

Examples of hydrocarbon groups of $R^{41}$ include an alkyl group, an alkenyl group, an aralkyl group, an aryl group, and an aryl group having a substituent. Examples of the substituted aryl group include substituted aryl groups wherein one, two or three hydrogen atoms of an aromatic ring are substituted. The hydrocarbon group of $R^{41}$ is preferably a group selected from an alkyl group and an alkenyl group.

The alkyl group of $R^{41}$ is preferably an aliphatic alkyl group, more preferably a linear aliphatic alkyl group, and further preferably a linear primary aliphatic alkyl group.

The alkenyl group of $R^{41}$ is preferably an aliphatic alkenyl group, more preferably a linear aliphatic alkenyl group, and further preferably a linear primary aliphatic alkenyl group.

From an economic viewpoint, $R^{41}$ is preferably an alkyl group.

From the viewpoint of the easy solubility in water, $R^{41}$ is preferably an alkenyl group.

In the general formula (C4), specific examples of $R^{41}$ include hydrocarbon groups having a carbon number of 4 or more and 30 or less.

The carbon number of $R^{41}$ is selected from preferably 8 or more, more preferably 12 or more, and further preferably 16 or more; and preferably 22 or less, more preferably 20 or less, and further preferably 18 or less.

Specific examples of $R^{41}$ include groups selected from a hydrocarbon group having a carbon number of preferably 10 or more, and more preferably 12 or more; and preferably 27 or less, more preferably 26 or less, and further preferably 24 or less; and a hydrocarbon group wherein a hydrogen atom thereof is substituted by a substituent.

Other specific examples of $R^{41}$ include groups selected from an alkyl group or an alkenyl group having a carbon number of preferably 10 or more and more preferably 12 or more; and preferably 27 or less, more preferably 26 or less, and further preferably 24 or less; and a group wherein a hydrogen atom of the alkyl or alkenyl group is substituted by a substituent.

Other specific examples of $R^{41}$ include groups selected from: an alkyl group, preferably an aliphatic alkyl group, more preferably a linear aliphatic alkyl group, and further preferably a linear primary aliphatic alkyl group, having a carbon number of preferably 10 or more, and more preferably 12 or more; and preferably 27 or less, more preferably 26 or less, and further preferably 24 or less; and an alkenyl group, preferably an aliphatic alkenyl group, more preferably a linear aliphatic alkenyl group, and further preferably a linear primary aliphatic alkenyl group, having a carbon number of preferably 10 or more, and more preferably 12 or more; and preferably 27 or less, more preferably 26 or less, and further preferably 24 or less.

More specific examples of $R^{41}$ include groups selected from a decyl group, a lauryl group, a myristyl group, a palmityl group, a stearyl group, a behenyl group, an isostearyl group, and an oleyl group. From the viewpoint of the fluidity improvement of a hydraulic composition, preferred is a group selected from a lauryl group, a myristyl group, a palmityl group, a stearyl group, a behenyl group, an isostearyl group, and an oleyl group. More preferred is a group selected from a lauryl group, a myristyl group, a palmityl group, a stearyl group, and an oleyl group.

In the general formula (C4), AO is an alkyleneoxy group having 2 or more and 4 or less carbon atoms, preferably an alkyleneoxy group having 2 or 3 carbon atoms. AO preferably includes an alkyleneoxy group having 2 carbon atoms.

In the general formula (C4), $Y^1$ and $Y^2$ are the same or different, each represents a hydrogen atom or $SO_3M$, and at least one of $Y^1$ and $Y^2$ is $SO_3M$. M is a counter ion, and examples thereof include a hydrogen ion, an alkali metal ion, an alkaline earth metal ion (½ atom) and an ammonium ion. From the viewpoint of the easiness of manufacturing a compound, M is preferably an ammonium ion. From the viewpoint of the offensive smell of a compound, M is preferably an alkali metal ion, more preferably an alkali metal ion selected from a sodium ion and a potassium ion.

In the general formula (C4), n5 and n6 are the same or different, each represents an average number of AO moles added and is 0 or more; when $n_5$ is 0, $Y^1$ is a hydrogen atom; and when $n_6$ is 0, $Y^2$ is a hydrogen atom. From the viewpoint of the cement dispersibility, the total of n5 and n6 is 1 or more, preferably 20 or more, and more preferably 50 or more; and from an economic viewpoint, 300 or less, preferably 200 or less, more preferably 150 or less, and further preferably 100 or less. $n_5$ and $n_6$ do not become 0 simultaneously. Therefore, compound (C4) has at least one of $(AO)_{n5}$—$SO_3M$ and $(AO)_{n6}$—$SO_3M$.

Examples of compound (C4) include sulfuric esters of aliphatic amine alkylene adduct such as beef tallow amine ethylene oxide adduct sulfuric ester.

Component (C) may be one or more compounds belonging to compound (C1), compound (C2), compound (C3) and compound (C4). From the viewpoint of the dispersibility, component (C) is preferably one or more compounds selected from compound (C1) and compound (C4). Further, from the viewpoint of the control of an air volume, component (C) is preferably one or more compounds selected from compound (C3) and compound (C4). Further, from an economic viewpoint, component (C) is one or more compounds selected from compound (C1) and compound (C3).

<Composition, etc. of a Dispersant Composition for a Hydraulic Composition>

The dispersant composition for a hydraulic composition of the present invention contains, in a solid content thereof, component (A) in an amount of preferably 1 mass % or more, more preferably 3 mass % or more, and further preferably 5 mass % or more; and preferably 99 mass % or less, more preferably 97 mass % or less, and further preferably 95 mass % or less.

Note that regarding the dispersant composition for a hydraulic composition, the solid content refers to components other than water.

The dispersant composition for a hydraulic composition of the present invention contains, in the solid content thereof, component (B) in an amount of preferably 1 mass % or more, more preferably 3 mass % or more, and further preferably 5 mass % or more; and preferably 95 mass % or less, more preferably 90 mass % or less, and further preferably 80 mass % or less.

The dispersant composition for a hydraulic composition of the present invention contains, in the solid content thereof, component (C) in an amount of preferably 2 mass % or more, more preferably 5 mass % or more, and further preferably 7 mass % or more; and preferably 90 mass % or less, more preferably 80 mass % or less, and further preferably 70 mass % or less.

From the viewpoint of decreasing the temperature dependency of the fluidity-imparting effect to a hydraulic composition, the dispersant composition for a hydraulic composition of the present invention has a mass ratio between components (A) and (B), (A)/(B), of preferably 0.01 or more, more preferably 0.05 or more, further preferably 0.1 or more, further more preferably 0.3 or more, further more preferably 1.0 or more, and further more preferably 3.0 or more; and preferably 100 or less, more preferably 55 or less, further preferably 10 or less, and further more preferably 5 or less.

From the viewpoint of the dispersibility improvement, the dispersant composition for a hydraulic composition of the present invention has a mass ratio between components (A) and (C), (A)/(C), of preferably 0.1 or more, more preferably 0.2 or more, further preferably 0.3 or more, further more preferably 0.4 or more, and further more preferably 0.5 or more; and preferably 30 or less, more preferably 20 or less, further preferably 10 or less, and further more preferably 5 or less.

From the viewpoint of the dispersibility improvement, the dispersant composition for a hydraulic composition of the present invention has a mass ratio between the total of components (A) and (B), and component (C), (C)/[(A)+(B)], of preferably 0.01 or more, more preferably 0.02 or more, further preferably 0.05 or more, further more preferably 0.1 or more, further more preferably 0.3 or more, further more preferably 0.4 or more, and further more preferably 0.6 or more; and preferably 10 or less, more preferably 7 or less, further preferably 5 or less, further more preferably 4 or less, further more preferably 2 or less, further more preferably 1 or less, and further more preferably 0.8 or less.

The dispersant composition for a hydraulic composition of the present invention may further contain (D) an antifoaming agent (hereinafter, referred to as component (D)).

As the component (D), exemplified are one or more antifoaming agents selected from a silicone-based antifoaming agent, a fatty acid ester-based antifoaming agent, an ether-based antifoaming agent excluding component (C), a polyalkylene oxide-based antifoaming agent, an alkyl phosphoric ester-based antifoaming agent and an acetylene glycol-based antifoaming agent.

As the component (D), preferred is one or more antifoaming agents selected from a silicone-based antifoaming agent, a fatty acid ester-based antifoaming agent and an ether-based antifoaming agent excluding component (C).

The silicone-based antifoaming agent is preferably dimethyl polysiloxane.

The fatty acid ester-based antifoaming agent is preferably a polyalkylene glycol fatty acid ester.

The ether-based antifoaming agent is preferably polyalkylene glycol alkyl ether.

The polyalkylene oxide-based antifoaming agent is preferably a block copolymer of ethylene oxide and propylene oxide.

The alkyl phosphoric ester-based antifoaming agent is preferably tributyl phosphate, isotributyl phosphate, or sodium octyl phosphate.

The acetylene glycol-based antifoaming agent is preferably 2,4,7,9-tetramethyl-5-decyne-4,7-diol or an alkyleneoxide adduct thereof.

As the component (D), a fatty acid ester-based antifoaming agent is preferred from the viewpoint of preventing strength reduction.

The silicone-based antifoaming agent is preferably in an emulsion form compatible with water. Examples of the emulsion form compatible with water include commercial products such as KM-70, KM-73A (both available from Sin-Etsu Chemical Co., Ltd.), TSA series (Momentive Performance Materials Japan Inc.), FS anti-foam series (Dow Corning Toray Co., Ltd.), and Anti-foam E-20 (Kao Corporation).

Examples of the fatty acid ester-based antifoaming agent include commercial products of polyalkylene glycol fatty acid ester such as Rheodol TW-L120 (Kao Corporation), Nicofix and Foamlex (both from Nicca Chemical Co., Ltd.).

Examples of the ether-based antifoaming agent include commercial products of polyalkylene glycol alkyl ether such as Defoamer No. 1, Defoamer No. 5 (all available from Kao Corporation), and Adeka Pluronic series (Adeka Corporation).

Examples of the polyalkylene oxide-based antifoaming agent include commercial products of a polyethyleneoxide polypropylene oxide block copolymer such as a block copolymer of ethyleneoxide and propyleneoxide, for example PLURONIC (TM) products (BASF).

As a commercial product of the acetylene glycol-based antifoaming agent, exemplified are SURFYNOL(TM) 400 series (Air Products and Chemicals, Inc.) and others.

The dispersant composition for a hydraulic composition of the present invention contains, in the solid content thereof, component (D) in an amount of preferably 0.001 mass % or more, more preferably 0.01 mass % or more, and further preferably 0.1 mass % or more; and preferably 10 mass % or less, more preferably 5 mass % or less, and further preferably 1 mass % or less.

From the viewpoint of the foaming prevention and the foam breaking, the dispersant composition for a hydraulic composition of the present invention has a mass ratio between components (C) and (D), (D)/(C), of preferably 0.00001 or more, more preferably 0.00005 or more, and further preferably 0.0001 or more; and preferably 0.5 or less, more preferably 0.1 or less, and further preferably 0.05 or less.

The dispersant composition for a hydraulic composition of the present invention may contain a component such as a conventional cement dispersant, a water-soluble polymer compound, an air entraining agent, a cement wetting agent, an expansive material, a waterproofing agent, a retarder, a set accelerating agent, a viscous agent, a coagulant, a drying shrinkage reducing agent, a strength enhancement agent, a hardening accelerator, and an antiseptic agent (excluding those corresponding to components (A) to (D)).

The dispersant composition for a hydraulic composition of the present invention may be in the form of both a liquid and a solid. In the case that the dispersant composition for a hydraulic composition of the present invention is in the form of a liquid, it preferably contains water. The dispersant composition for a hydraulic composition of the present invention may be a one-part composition containing component (A), component (B) and component (C). The dispersant composition for a hydraulic composition of the present invention may be a one-part composition containing component (A), component (B), component (C), and optionally a component other than these components.

When the dispersant composition for a hydraulic composition is in the form of a liquid containing water, the content of the water in the composition is, from the viewpoint of workability at the time of preparing the hydraulic composition, preferably 10 mass % or more, more preferably 30 mass % or more, and further preferably 50 mass % or more; and from the viewpoint of the fluidity improvement of a hydraulic composition, preferably 90 mass % or less, and more preferably 70 mass % or less.

When the dispersant composition for a hydraulic composition is in the foam of a liquid containing water, the content of component (A) in the composition is, from the viewpoint of improving the fluidity of the hydraulic composition, preferably 1 mass % or more, more preferably 4 mass % or more, and further preferably 7 mass % or more; and preferably 50 mass % or less, more preferably 32 mass % or less, and further preferably 27 mass % or less.

When the dispersant composition for a hydraulic composition is in the form of a liquid containing water, the content of component (B) in the composition is, from the viewpoint of improving the fluidity of the hydraulic composition, preferably 1 mass % or more, more preferably 4 mass % or more, and further preferably 7 mass % or more; and preferably 60 mass % or less, more preferably 50 mass % or less, and further preferably 32 mass % or less.

When the dispersant composition for a hydraulic composition is in the form of a liquid containing water, the content of component (C) in the composition is, from the viewpoint of improving the fluidity of the hydraulic composition, preferably 1 mass % or more, more preferably 4 mass % or more, and further preferably 7 mass % or more; and preferably 60 mass % or less, more preferably 50 mass % or less, and further preferably 32 mass % or less.

When the dispersant composition for a hydraulic composition is in the form of a liquid containing water, the total content of components (A), (B) and (C) is, from the viewpoint of improving the fluidity of the hydraulic composition, preferably 10 mass % or more, more preferably 20 mass % or more, and further preferably 30 mass % or more; and preferably 90 mass % or less, more preferably 70 mass % or less, and further preferably 50 mass % or less.

As the dispersant composition for a hydraulic composition of the present invention, exemplified is a dispersant composition for a hydraulic composition containing:

(A) a high-molecular compound having a naphthalene ring-containing monomer unit;

(B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group; and (C) one or more compounds selected from a compound represented by the following general formula (C1), a compound represented by the following general formula (C2), a compound represented by the following general formula (C3), and a compound represented by the following general formula (C4),

[Chemical formula 6]

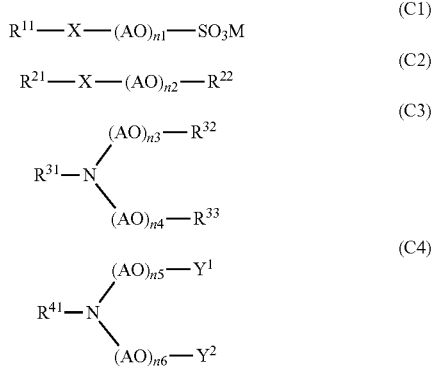

wherein:

$R^{11}$, $R^{21}$, $R^{31}$, and $R^{41}$ are the same or different and each represents a hydrocarbon group having a carbon number of 4 or more and 30 or less;

$R^{22}$, $R^{32}$ and $R^{33}$ are the same or different and each represents a hydrogen atom or an alkyl group having a carbon number of 1 or more and 3 or less;

$Y^1$ and $Y^2$ are the same or different, each represents a hydrogen atom or $SO_3M$, and at least one of $Y^1$ and $Y^2$ is $SO_3M$;

AO is an alkyleneoxy group having a carbon number of 2 or more and 4 or less;

$n_1$ represents an average number of AO moles added and is 0 or more and 300 or less;

$n_2$ represents an average number of AO moles added and is 1 or more and 300 or less;

$n_3$ and $n_4$ are the same or different, and each represents an average number of AO moles added and is 0 or more, and a total of $n_3$ and $n_4$ is 1 or more and 300 or less;

$n_5$ and $n_6$ are the same or different; each represents an average number of AO moles added and is 0 or more; a total of $n_5$ and $n_6$ is 1 or more and 300 or less; when $n_5$ is 0, $Y^1$ is a hydrogen atom; and when $n_6$ is 0, $Y^2$ is a hydrogen atom;

X is O or COO; and

M is a counter ion.

[Dispersant Composition for an Inorganic Powder]

Specific examples and preferred embodiments of components (A), (B) and (C) used in a dispersant composition for an inorganic powder of the present invention are the same as those mentioned for the dispersant composition for a hydraulic composition of the present invention. Further, the dispersant composition for an inorganic powder of the present invention may contain component (D) or an antifoaming agent. Specific examples and preferred embodiments of component (D) are the same as those mentioned for the dispersant composition for a hydraulic composition of the present invention.

The inorganic powder is not particularly limited, but examples thereof are listed below. Those used for hydraulic powders among inorganic powders are the dispersant composition for a hydraulic composition of the present invention.

(1) hydraulic powders such as cement and gypsum
(2) powders having a pozzolanic action such as fly ash, silica fume, volcanic ash, and silicate clay
(3) potential hydraulic powders such as coal ash, blast-furnace slag and diatomaceous earth
(4) silicates such as kaolin, aluminum silicate, clay, talc, mica, calcium silicate, sericite, and bentonite
(5) carbonates such as calcium carbonate, magnesium carbonate, barium carbonate, and basic lead carbonate
(6) sulfates such as calcium sulfate and barium sulfate
(7) chromates such as strontium chromate and pigment yellow
(8) molybdates such as zinc molybdate, calcium-zinc molybdate, and magnesium molybdate
(9) metallic oxides such as alumina, antimony oxide, titanium oxide, cobalt oxide, triiron tetraoxide, diiron trioxide, trilead tetroxide, lead monoxide, chrome oxide green, tungsten trioxide, and yttrium oxide
(10) metallic hydroxides such as aluminum hydroxide, magnesium hydroxide, calcium hydroxide, iron hydroxide, and metatitanic acid
(11) metallic carbides such as silicon carbide, tungsten carbide, boron carbide and titanium carbide
(12) other inorganic powders not classified in the above (1) to (11), such as aluminum nitride, silicon nitride, boron nitride, zirconia, barium titanate, satin white, carbon black, graphite, chrome yellow, mercury sulfide, ultramarine, Paris blue, titanium yellow, chrome vermilion, lithopone, copper acetoarsenite, nickel, silver, palladium, and lead zirconate titanate The dispersant composition for an inorganic powder of the present invention may be used for an inorganic powder slurry. The inorganic powder slurry is a slurry, which contains an inorganic powder, water, component (A), component (B) and component (C). When the inorganic powder is a hydraulic powder, a slurry is a hydraulic composition of the present invention.

Specific examples and preferred embodiments of components (A), (B) and (C) used for the slurry of the present invention are the same as those mentioned for the dispersant composition for a hydraulic composition of the present invention.

As the inorganic powder slurry, exemplified is a slurry using, for example, blast furnace slag as an inorganic powder (hereinafter, referred to as blast furnace slag slurry). The blast furnace slag slurry preferably contains the dispersant composition for an inorganic powder of the present invention in an amount of from 0.01 parts by mass to 5.0 parts by mass relative to 100 parts by mass of blast furnace slag in terms of a solid content. The blast furnace slag slurry contains water in an amount of preferably 40 parts by mass or more, more preferably 45 parts by mass or less; and preferably 250 parts by mass, and more preferably 230 parts by mass or less, relative to 100 parts by mass of blast furnace slag. Further, the blast furnace slag slurry preferably contains component (D). The blast furnace slag slurry has a mass ratio of components (C) and (D), (D)/(C), of preferably 0.00001 or more, more preferably 0.00005 or more, and further preferably 0.0001 or more; and preferably 0.5 or less, more preferably 0.1 or less, and further preferably 0.05 or less.

[Hydraulic Composition]

The present invention provides a hydraulic composition, which contains a hydraulic powder, water, component (A), component (B) and component (C). A hydraulic composition may be prepared by using components (A), (B) and (C) with the addition of a dispersant composition for a hydraulic composition of the present invention, and a hydraulic composition may be prepared by separately adding them to a mixture containing a hydraulic powder and water.

The hydraulic powder used for the hydraulic composition of the present invention is a powder having a property, which enables the powder to be hardened by hydration, and examples thereof include cement and gypsum. The hydraulic powder is preferably cement such as ordinary portland cement, belite cement, moderate heat cement, early strength cement, ultra early strength cement, and sulfate resisting cement. Further, it may be blast furnace slag cement, fly ash cement, silica fume cement or the like, which is prepared by adding a powder having a pozzolanic action and/or potential hydraulicity such as blast furnace slag, fly ash and silica fume, or stone powder (calcium carbonate powder) to cement or the like.

The hydraulic composition of the present invention has a water/hydraulic powder ratio (mass percentage (mass %) of water and hydraulic powder in a slurry, usually abbreviated as W/P, but when the powder is cement, abbreviated as W/C) of preferably 15 mass % or more, and more preferably 20 mass % or more; and preferably 50 mass % or less, more preferably 45 mass % or less, and further preferably 40 mass % or less, in terms of exhibiting the fluidity of the hydraulic composition even with a small amount of water blended.

Specific examples and preferred embodiments of components (A), (B) and (C) used in the hydraulic composition of the present invention are the same as those mentioned for the dispersant composition for a hydraulic composition of the present invention.

The hydraulic composition of the present invention contains component (A) in an amount of preferably 0.01 parts by mass or more, more preferably 0.03 parts by mass or more, further preferably 0.05 parts by mass or more, further more preferably 0.1 parts by mass or more, further more preferably 0.15 parts by mass or more, and further more preferably 0.30 parts by mass or more; and preferably 2 parts by mass or less, more preferably 1.5 parts by mass or less, further preferably 1.0 part by mass or less, and further more preferably 0.80 parts by mass or less, relative to 100 parts by mass of the hydraulic powder.

The hydraulic composition of the present invention contains component (B) in an amount of preferably 0.005 parts by mass or more, more preferably 0.03 parts by mass or more, further preferably 0.05 parts by mass or more, further more preferably 0.1 parts by mass or more, further more preferably 0.15 parts by mass or more, and further more preferably 0.2 parts by mass or more; and preferably 3 parts by mass or less, more preferably 2 parts by mass or less, further preferably 1.5 parts by mass or less, further more preferably 1.0 part by mass or less, further more preferably 0.7 parts by mass or less, and further more preferably 0.5 parts by mass or less, relative to 100 parts by mass of the hydraulic powder.

The hydraulic composition of the present invention contains component (C) in an amount of preferably 0.01 parts by mass or more, more preferably 0.02 parts by mass or more, further preferably 0.04 parts by mass or more, further more preferably 0.06 parts by mass or more, further more preferably 0.08 parts by mass or more, further more preferably 0.1 parts by mass or more, and further more preferably 0.3 parts by mass or more; and preferably 2 parts by mass or less, more preferably 1.5 parts by mass or less, further preferably 1.3 parts by mass or less, further more preferably 1 part by mass or less, further more preferably 0.8 parts by mass or less, and further more preferably 0.6 parts by mass or less, relative to 100 parts by mass of the hydraulic powder.

The hydraulic composition of the present invention contains components (A) and (B) in total in an amount of preferably 0.005 parts by mass or more, more preferably 0.03 parts by mass or more, further preferably 0.1 parts by mass or more, further more preferably 0.15 parts by mass or more, and further more preferably 0.3 parts by mass or more; and preferably 5 parts by mass or less, more preferably 3 parts by mass or less, further preferably 2 parts by mass or less, and further more preferably 1 part by mass or less, relative to 100 parts by mass of the hydraulic powder.

The hydraulic composition of the present invention contains components (A), (B) and (C) in total in an amount of preferably 0.01 parts by mass or more, more preferably 0.05 parts by mass or more, further preferably 0.1 parts by mas or more, further more preferably 0.14 parts by mass or more, further more preferably 0.20 parts by mass or more, further more preferably 0.40 parts by mass or more, and further more preferably 0.70 parts by mass or more; and preferably 5 parts by mass or less, more preferably 4 parts by mass or less, further preferably 3 parts by mass or less, further more preferably 2 parts by mass or less, and further more preferably 1.5 parts by mass or less, relative to 100 parts by mass of the hydraulic powder.

From the viewpoint of reducing the temperature dependency, the hydraulic composition of the present invention has a mass ratio of components (A) and (B), (A)/(B), of preferably 0.01 or more, more preferably 0.05 or more, further preferably 0.1 or more, further more preferably 0.3 or more, further more preferably 1.0 or more, and further more preferably 3.0 or more; and preferably 100 or less, more preferably 55 or less, further preferably 10 or less, and further more preferably 5 or less.

From the viewpoint of the dispersibility improvement, the hydraulic composition of the present invention has a mass ratio of components (A) and (C), (A)/(C), of preferably 0.1 or more, more preferably 0.2 or more, further preferably 0.3 or more, further more preferably 0.4 or more, and further more preferably 0.5 or more; and preferably 30 or less, more preferably 20 or less, further preferably 10 or less, and further more preferably 5 or less.

From the viewpoint of the dispersibility improvement, the hydraulic composition of the present invention has a mass ratio between the total of components (A) and (B), and component (C), (C)/[(A)+(B)], of preferably 0.01 or more, more preferably 0.02 or more, further preferably 0.05 or more, further more preferably 0.1 or more, further more preferably 0.3 or more, further more preferably 0.4 or more, and further more preferably 0.6 or more; and preferably 10 or less, more preferably 7 or less, further preferably 5 or less, further more preferably 4 or less, further more preferably 2 or less, further more preferably 1 or less, and further more preferably 0.8 or less.

The hydraulic composition of the present invention may further contain an antifoaming agent as component (D). Specific examples and preferred embodiments of the antifoaming are the same as those described for the dispersant composition for a hydraulic composition of the present invention. When component (D) is used, the hydraulic composition of the present invention contains component (D) in an amount of preferably 0.0005 parts by mass or more, more preferably 0.00025 parts by mass or more, further preferably 0.0005 parts by mass or more; and preferably 0.1 parts by mass or less, more preferably 0.075 parts by mass or less, and further preferably 0.05 parts by mass or less, relative to 100 parts by mass of the hydraulic powder.

From the viewpoint of the foaming prevention and the foam breaking, the hydraulic composition of the present invention has a mass ration of components (C) and (D), (D)/(C), of preferably 0.00001 or more, more preferably 0.00005 or more, and further preferably 0.0001 or more; and preferably 0.5 or less, more preferably 0.1 or less, and further preferably 0.05 or less.

The hydraulic composition of the present invention preferably contains an aggregate. Examples of the aggregate include aggregates selected from fine aggregates and coarse aggregates. As the fine aggregate, those defined in No. 2311 of JIS A0203-2014 are exemplified. Examples of the fine aggregate include river sand, land sand, pit sand, sea sand, lime sand, silica sand and crushed sand thereof, blast furnace slag fine aggregate, ferronickel slag fine aggregate, lightweight fine aggregate (artificial and natural), and recycled fine aggregate. Further, as the coarse aggregate, those defined in No. 2312 of JIS A0203-2014 are exemplified. Examples of the coarse aggregate include river gravel, land gravel, pit gravel, sea gravel, lime gravel, crushed stone thereof, blast furnace slag coarse aggregate, ferronickel slag coarse aggregate, light-weight coarse aggregate (artificial and natural), and recycled coarse aggregate. Different types of fine aggregate and coarse aggregate may be mixed and used, or a single type thereof may be used.

In the case that the hydraulic composition is concrete, the bulk volume pertaining to the amount of coarse aggregate to be used is preferably 50% or more, more preferably 55% or more, and further preferably 60% or more; and preferably 100% or less, more preferably 90% or less, and further preferably 80% or less, from the viewpoint of exhibiting the strength of the hydraulic composition, reducing the amount of the hydraulic powder to be used such as cement, and improving the filling property into foil's and the like. The bulk volume is a ratio of volume (including voids) of coarse aggregate in 1 m$^3$ of concrete.

Further, in the case that the hydraulic composition is concrete, the amount of fine aggregate to be used is preferably 500 kg/m$^3$ or more, more preferably 600 kg/m$^3$ or more, and further preferably 700 kg/m$^3$; and preferably 1000 kg/m$^3$ or less, and more preferably 900 kg/m$^3$, from the viewpoint of improving the filling property into forms and the like.

In the case that the hydraulic composition is mortar, the amount of fine aggregate to be used is preferably 800 kg/m$^3$ or more, more preferably 900 kg/m$^3$ or more, and further preferably 1000 kg/m$^3$ or more; and preferably 2000 kg/m$^3$ or less, more preferably 1800 kg/m$^3$ or less, and further preferably 1700 kg/m$^3$ or less.

As the hydraulic composition, concrete and the like are exemplified. Especially, concrete using cement is preferred. The hydraulic composition of the present invention is useful in any field for self-leveling, refractories, plaster, lightweight or heavy-weight concrete, AE, repairing, prepacking, tremies, foundation improvement, grout and cold weather.

The hydraulic composition of the present invention may further contain other component. Examples thereof include an AE agent, a retarder, a foaming agent, a viscous agent, a blowing agent, a waterproofing agent, and a fluidizing agent (excluding those corresponding to components (A) to (D)).

As the hydraulic composition of the present invention, exemplified is a hydraulic composition, which contains:
a hydraulic powder;
water;
(A) a high-molecular compound having a naphthalene ring-containing monomer unit;
(B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group; and (C) one or more compounds selected from a compound represented by the following general formula (C1), a compound represented by the following general formula (C2), a compound represented by the following general formula (C3), and a compound represented by the following general formula (C4),

[Chemical formula 7]

 (C1)

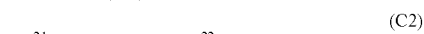 (C2)

 (C3)

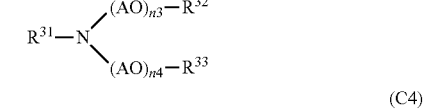 (C4)

wherein:
$R^{11}$, $R^{21}$, $R^{31}$, and $R^{41}$ are the same or different and each represents a hydrocarbon group having a carbon number of 4 or more and 30 or less;
$R^{22}$, $R^{32}$ and $R^{33}$ are the same or different and each represents a hydrogen atom or an alkyl group having a carbon number of 1 or more and 3 or less;
$Y^1$ and $Y^2$ are the same or different, each represents a hydrogen atom or $SO_3M$, and at least one of $Y^1$ and $Y^2$ is $SO_3M$;
AO is an alkyleneoxy group having a carbon number of 2 or more and 4 or less;
$n_1$ represents an average number of AO moles added and is 0 or more and 300 or less;
$n_2$ represents an average number of AO moles added and is 1 or more and 300 or less;
$n_3$ and $n_4$ are the same or different, and each represents an average number of AO moles added and is 0 or more, and a total of $n_3$ and $n_4$ is 1 or more and 300 or less;
$n_5$ and $n_6$ are the same or different; each represents an average number of AO moles added and is 0 or more; a total of $n_5$ and $n_6$ is 1 or more and 300 or less; when $n_5$ is 0, $Y^1$ is a hydrogen atom; and when $n_6$ is 0, $Y^2$ is a hydrogen atom;
X is O or COO; and
M is a counter ion.

[Method for Manufacturing a Dispersant Composition for a Hydraulic Composition]

The present invention provides a method for manufacturing a dispersant composition for a hydraulic composition, which includes mixing components (A), (B) and (C).

Specific examples and preferred embodiments of components (A), (B) and (C) used for the method of the present invention for manufacturing a dispersant composition for a hydraulic composition are the same as those described for the dispersant composition for a hydraulic composition of the present invention. Further, a dispersant composition for a hydraulic composition containing components (A), (B), (C) and (D) may be manufactured by mixing components (A), (B), (C) and (D). Specific examples and preferred embodiments of component (D) are the same as those described for the dispersant composition for a hydraulic composition of the present invention.

Further, the matters described for the dispersant composition for a hydraulic composition of the present invention are appropriately applicable to the method for manufacturing a dispersant composition for a hydraulic composition of the present invention.

The method of the present invention for manufacturing a dispersant composition for a hydraulic composition is suitable as a method for manufacturing a dispersant composition for a hydraulic composition of the present invention.

As the method of the present invention for manufacturing a dispersant composition for a hydraulic composition, exemplified is a method for manufacturing a dispersant composition for a hydraulic composition, which contains component (A), component (B), component (C) and water. In this case, mixing components (A), (B) and (C) and water may be conducted by any method as long as the performance is not reduced. Usable are, for example, a method of mixing an aqueous solution of component (A) heated to a freezing point or higher of component (C), an aqueous solution of component (B) heated to a freezing point or higher of component (C), and component (C) by a stirrer, and a method of dissolving components (A), (B) and (C) in water, respectively, and mixing an aqueous solution of component (A), an aqueous solution of component (B) and an aqueous solution of component (C).

[Method for Manufacturing a Hydraulic Composition]

The present invention provides a method for manufacturing a hydraulic composition, which includes mixing a hydraulic powder, water, component (A), component (B) and component (C).

Specific examples and preferred embodiments of components (A), (B) and (C) used for the method of the present invention for manufacturing a hydraulic composition are the same as those described for the dispersant composition for a hydraulic composition of the present invention.

Also, specific examples and preferred embodiments for the hydraulic powder used for the method for manufacturing a hydraulic composition of the present invention are the same as those described for the hydraulic composition of the present invention.

Further, a dispersant composition for a hydraulic composition of the present invention containing a hydraulic powder, water, component (A), component (B), component (C) and component (D) may be manufactured by mixing the hydraulic powder, water, component (A), component (B), component (C) and component (D). Specific examples and preferred embodiments of component (D) are the same as those described for the dispersant composition for a hydraulic composition of the present invention.

Also, the matters described for the dispersant composition for a hydraulic composition of the present invention and the hydraulic composition are appropriately applicable to the method of the present invention for manufacturing a hydraulic composition.

In the method of the present invention for manufacturing a hydraulic composition, component (A) is mixed in an amount of preferably 0.01 parts by mass or more, more preferably 0.03 parts by mass or more, further preferably 0.05 parts by mass or more, further more preferably 0.1 parts by mass or more, further more preferably 0.15 parts by mass or more, and further more preferably 0.30 parts by mass or more; and preferably 2 parts by mass or less, more preferably 1.5 parts by mass or less, further preferably 1 part by mass or less, and further more preferably 0.80 parts by mass or less, relative to 100 parts by mass of hydraulic powder.

In the method of the present invention for manufacturing a hydraulic composition, component (B) is mixed in an amount of preferably 0.005 parts by mass or more, more preferably 0.03 parts by mass or more, further preferably 0.05 parts by mass or more, further more preferably 0.1 parts by mass or more, further more preferably 0.15 parts by mass or more, and further more preferably 0.2 parts by mass or more; and preferably 3 parts by mass or less, more preferably 2 parts by mass or less, further preferably 1.5 parts by mass or less, further more preferably 1.0 part by mass or less, further more preferably 0.7 parts by mass or less, and further more preferably 0.5 parts by mass or less, relative to 100 parts by mass of hydraulic powder.

In the method of the present invention for manufacturing a hydraulic composition, component (C) is mixed in an amount of preferably 0.01 parts by mass or more, more preferably 0.02 parts by mass or more, further preferably 0.04 parts by mass or more, further more preferably 0.06 parts by mass or more, further more preferably 0.08 parts by mass or more, further more preferably 0.1 parts by mass or more, and further more preferably 0.3 parts by mass or more; and preferably 2 parts by mass or less, more preferably 1.5 parts by mass or less, further preferably 1.3 parts by mass or less, further more preferably 1 part by mass or less, further more preferably 0.8 parts by mass or less, and further more preferably 0.6 parts by mass or less, relative to 100 parts by mass of hydraulic powder.

In the method of the present invention for manufacturing a hydraulic composition, components (A) and (B) are mixed in total in an amount of preferably 0.005 parts by mass or more, more preferably 0.03 parts by mass or more, further preferably 0.1 parts by mass or more, further more preferably 0.15 parts by mass or more, and further more preferably 0.3 parts by mass or more; and preferably 5 parts by mass or less, more preferably 3 parts by mass or less, further preferably 2 parts by mass or less, and further more preferably 1 part by mass or less, relative to 100 parts by mass of hydraulic powder.

In the method of the present invention for manufacturing a hydraulic composition, components (A), (B) and (C) are mixed in total in an amount of preferably 0.01 parts by mass or more, more preferably 0.05 parts by mass or more, further preferably 0.1 parts by mass or more, further more preferably 0.14 parts by mass or more, further more preferably 0.20 parts by mass or more, further more preferably 0.40 parts by mass or more, and further more preferably 0.70 parts by mass or more; and preferably 5 parts by mass or less, more preferably 4 parts by mass or less, further preferably 3 parts by mass or less, further more preferably 2 parts by mass or less, and further more preferably 1.5 parts by mass or less, relative to 100 parts by mass of hydraulic powder.

In the method of the present invention for manufacturing a hydraulic composition, from the viewpoint of reducing the temperature dependency, components (A) and (B) are mixed in a mass ratio (A)/(B) of preferably 0.01 or more, more preferably 0.05 or more, further preferably 0.1 or more, further more preferably 0.3 or more, further more preferably 1.0 or more, and further more preferably 3.0 or more; and preferably 100 or less, more preferably 55 or less, further preferably 10 or less, and further more preferably 5 or less.

In the method of the present invention for manufacturing a hydraulic composition, from the viewpoint of the dispersibility improvement, components (A), (B) and (C) are mixed in a mass ratio between the total of components (A) and (B), and component (C), (C)/[(A)+(B)], of preferably 0.01 or more, more preferably 0.02 or more, further preferably 0.05 or more, further more preferably 0.1 or more, further more preferably 0.3 or more, further more preferably 0.4 or more, and further more preferably 0.6 or more; and preferably 10 or less, more preferably 7 or less, further preferably 5 or less, further more preferably 4 or less, further more preferably 2 or less, further more preferably 1 or less, and further more preferably 0.8 or less.

In the method of the present invention for manufacturing a hydraulic composition, an antifoaming agent may be further mixed as component (D). Specific examples and preferred embodiments of the antifoaming agent are the same as those described for the dispersant composition for a hydraulic composition of the present invention. When component (D) is used in the method of the present invention for manufacturing a hydraulic composition, component (D) is mixed in an amount of 0.0005 parts by mass or more, more preferably 0.0025 parts by mass or more, and further preferably 0.005 parts by mass or more; and preferably 0.1 parts by mass or less, more preferably 0.075 parts by mass or less, and further preferably 0.05 parts by mass or less, relative to 100 parts by mass of hydraulic powder.

In the method of the present invention for manufacturing a hydraulic composition, from the view point of smoothly mixing components (A), (B) and (C) with a hydraulic powder such as cement, it is preferred that components (A), (B) and (C) be mixed with water in advance, and then mixed with the hydraulic powder. The dispersant composition for a hydraulic composition of the present invention, which contains water, can be used.

Further, in the method of the present invention for manufacturing a hydraulic composition, a method for mixing a hydraulic powder such as cement with the dispersant composition for a hydraulic composition of the present invention is preferred. The dispersant composition for a hydraulic composition of the present invention may be in the foam of powder or liquid, and it is preferred that components (A), (B) and (C), and further component (D) be added in above-described amounts relative to the hydraulic powder. Specifically, the dispersant composition for a hydraulic composition of the present invention is mixed in an amount of preferably 0.01 parts by mass or more, more preferably 0.05 parts by mass or more, further preferably 0.1 parts by mass or more, and further more preferably 0.15 parts by mass or more; and preferably 5 parts by mass or less, more preferably 4 parts by mass or less, further preferably 3 parts by mass or less, and further more preferably 2 parts by mass or less, relative to 100 parts by mass of hydraulic powder.

The hydraulic powder, water, component (A), component (B) and component (C) are mixed by a mixer such as a mortar mixer and a biaxial pug mill. In addition, the mixing is performed for preferably 1 minute or more, and more preferably 2 minutes or more; and preferably 5 minutes or less and more preferably 3 minutes or less. In preparing the hydraulic composition, the materials or agents, and the amounts thereof explained for the hydraulic composition are applicable.

An obtained hydraulic composition is further filled into a form, cured and hardened. As the form, exemplified are forms for buildings, forms for concrete products and others. As a method for filling into a form, exemplified are: a method for pouring directly from a mixer; a method for force-feeding a hydraulic composition by a pump and introducing it into a form; and others.

For acceleration of hardening in curing a hydraulic composition, heat-curing may be applied, thereby causing accelerated hardening. For the heat-curing, maintaining a hydraulic composition at a temperature of 40° C. or higher and 80° C. or lower enables hardening thereof to be accelerated.

The present invention provides a method for manufacturing a hardened product, which has:

preparing a hydraulic composition by mixing a hydraulic powder, water, component (A), component (B) and component (C);

filling the prepared hydraulic composition into a form, curing and hardening; and removing the hardened hydraulic composition from the form.

The matters described for the dispersant composition for a hydraulic composition, the hydraulic composition, the method for manufacturing a dispersant composition for a hydraulic composition, and the method for manufacturing a hydraulic composition of the present invention are applicable to this method for manufacturing a hardened product.

Examples of the hardened product of the hydraulic composition using a form, which is a concrete product, include products for civil engineering such as various block products for revetment, box culvert products, segment products used for tunnel construction, and girder products for bridge piers; and products for architecture such as curtain wall products and building component products used for pillars, beams and floor plates.

[Method for Improving Dispersing Performance]

The present invention provides, in preparing a hydraulic composition by mixing a hydraulic powder, water, component (A) and component (B), a method for improving dispersing performance of components (A) and (B) for the hydraulic powder, wherein the method includes adding component (C). Components (A) and (B) are each known as a dispersant for a hydraulic powder, and its dispersing performance improves the fluidity of a hydraulic composition. However, combined use of components (A) and (B) does not improve the fluidity of a hydraulic composition. On the contrary, the fluidity significantly decreases. In the present invention, addition of component (C) improves the fluidity of a hydraulic composition compared to a case where components (A) and (B) are used in combination. That is, addition of component (C) improves the dispersing performance of a dispersant with combined use of components (A) and (B) for a hydraulic powder.

Specific examples and preferred embodiments of components (A), (B) and (C) used in the method of the present invention for improving dispersing performance are the same as those described for the dispersant composition for a hydraulic composition of the present invention.

Further, specific examples and preferred embodiments of the hydraulic powder used in the method of the present invention for improving dispersing performance are the same as those described for the hydraulic composition of the present invention.

Further, the matters described for the dispersant composition for a hydraulic composition, the hydraulic composition, the method for manufacturing a dispersant composition for a hydraulic composition, and the method for manufacturing a hydraulic composition of the present invention are appropriately applicable to the method of the present invention for improving dispersing performance.

In addition to the above, the present invention discloses use of a composition containing components (A), (B) and (C) as a dispersant for a hydraulic composition.

Further, the present invention discloses use of a composition containing a hydraulic powder, water, component (A), component (B) and component (C) as a hydraulic composition.

To these uses, the matters described for the dispersant composition for a hydraulic composition, the dispersant composition for an inorganic powder, the hydraulic composition, the method for manufacturing a dispersant composition for a hydraulic composition, the method for manufacturing a hydraulic composition, and the method for improving dispersing performance of the present invention can be appropriately applied.

Further, the present invention discloses a composition containing components (A), (B) and (C), which is used for a dispersant for a hydraulic composition.

Further, the present invention discloses a composition containing a hydraulic powder, water, and component (A), (B) and (C), which is used for a hydraulic composition.

To these compositions, the matters described for the dispersant composition for a hydraulic composition, the dispersant composition for an inorganic powder, the hydraulic composition, the method for manufacturing a dispersant composition for a hydraulic composition, the method for manufacturing a hydraulic composition, and the method for improving dispersing performance of the present invention can be appropriately applied.

<Embodiments of the Present Invention>

Hereinafter, embodiments of the present invention are exemplified. The matters described for a dispersant composition for a hydraulic composition, a hydraulic composition, a method for manufacturing a dispersant composition for a hydraulic composition, a method for manufacturing a hydraulic composition, and a method for improving dispersing performance according to the present invention can be appropriately applied to these embodiments.

<1>

A dispersant composition for a hydraulic composition, containing:

(A) a high-molecular compound having a naphthalene ring-containing monomer unit;

(B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group; and (C) one or more compounds selected from a compound represented by the following general formula (C1), a compound represented by the following general formula (C2), a compound represented by the following general formula (C3), and a compound represented by the following general formula (C4),

[Chemical formula 8]

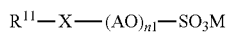 (C1)

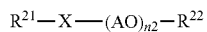 (C2)

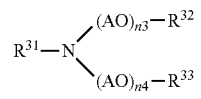 (C3)

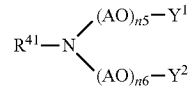 (C4)

wherein:

$R^{11}$ is a hydrocarbon group, and a compound in the form of $R^{11}$—H has an HLB of 5.10 or less;

$R^{21}$ is a hydrocarbon group, and a compound in the form of $R^{21}$—H has an HLB of 5.10 or less;

$R^{31}$ is a hydrocarbon group, and a compound in the form of $R^{31}$—H has an HLB of 5.10 or less;

$R^{41}$ is a hydrocarbon group, and a compound in the form of $R^{41}$—H has an HLB of 5.10 or less;

$R^{22}$, $R^{32}$ and $R^{33}$ are the same or different and each represents a hydrogen atom or an alkyl group having a carbon number of 1 or more and 3 or less;

$Y^1$ and $Y^2$ are the same or different, each represents a hydrogen atom or $SO_3M$, and at least one of $Y^1$ and $Y^2$ is $SO_3M$;

AO is an alkyleneoxy group having a carbon number of 2 or more and 4 or less;

$n_1$ represents an average number of AO moles added and is 0 or more and 300 or less;

$n_2$ represents an average number of AO moles added and is 1 or more and 300 or less;

$n_3$ and $n_4$ are the same or different, and each represents an average number of AO moles added and is 0 or more, and a total of $n_3$ and $n_4$ is 1 or more and 300 or less;

$n_5$ and $n_6$ are the same or different; each represents an average number of AO moles added and is 0 or more; a total of $n_5$ and $n_6$ is 1 or more and 300 or less; when $n_5$ is 0, $Y^1$ is a hydrogen atom; and when $n_6$ is 0, $Y^2$ is a hydrogen atom;

X is O or COO; and

M is a counter ion.

<2>

The dispersant composition for a hydraulic composition described in the above <1>, wherein component (A) is a formaldehyde naphthalenesulfonate condensate or a salt thereof.

<3>

The dispersant composition for a hydraulic composition described in the above <2>, wherein component (A) has a weight average molecular weight of preferably 200,000 or less, more preferably 100,000 or less, further preferably 80,000 or less, further more preferably 50,000 or less, and further more preferably 30,000 or less.

<4>

The dispersant composition for a hydraulic composition described in the above <2> or <3>, wherein component (A) has a weight average molecular weight of preferably 1,000 or more, more preferably 3,000 or more, further preferably 4,000 or more, and further more preferably 5,000 or more.

<5>

The dispersant composition for a hydraulic composition described in any of the above <1> to <4>, wherein the dispersant composition for a hydraulic composition contains, in a solid content thereof, component (A) in an amount of preferably 1 mass % or more, more preferably 3 mass % or more, and further preferably 5 mass % or more; and preferably 99 mass % or less, more preferably 97 mass % or less, and further preferably 95 mass % or less.

<6>

The dispersant composition for a hydraulic composition described in any of the above <1> to <5>, wherein the carboxylic acid group of component (B) is a group represented by —$COOM^0$ ($M^0$ represent a counter ion).

<7>

The dispersant composition for a hydraulic composition described in any of the above <1> to <6>, wherein the phosphate group of component (B) is a group represented by —OPO(OM$^1$)(OM$^2$) (M$^1$ and M$^2$ are the same or different and each represents a counter ion).

<8>

The dispersant composition for a hydraulic composition described in any of the above <1> to <7>, wherein component (B) is one or more compounds selected from: an addition polymer of a phosphate compound and/or a carboxylic acid compound having an unsaturated bond and a compound having a monomer unit having an alkyleneoxy group with an unsaturated bond; and a condensate of formaldehyde and a compound having a monomer unit with a group selected from a carboxylic acid group and a phosphate group and a monomer unit having an alkyleneoxy group.

<9>

The dispersant composition for a hydraulic composition described in any of the above <1> to <8>, wherein component (B) is (1) a copolymer obtained by copolymerizing alkoxypolyalkylene glycol (meth)acrylate, and one or more selected from (meth)acrylic acid, (meth)acrylic acid ester having a carbon number of 1 or more and 3 or less and optionally having a hydroxyl group, and a phosphoric ester having an unsaturated group; and (2) a copolymer obtained by copolymerizing an ether compound of polyalkylene glycol and an unsaturated alcohol, and one or more selected from dicarboxylic acids and dicarboxylic acid anhydrides, wherein (meth)acrylate is acrylate or methacrylate, and (meth)acrylic acid is acrylic acid or methacrylic acid.

<10>

The dispersant composition for a hydraulic composition described in any of the above <1> to <9>, wherein the monomer unit of component (B) having a carboxylic acid group is a monomer unit derived from one or more monomers selected from a monocarboxylic acid having an addition-polymerizable unsaturated bond and a dicarboxylic acid having an addition-polymerizable unsaturated bond, preferably a monomer unit derived from one or more monomers selected from acrylic acid, methacrylic acid, crotonic acid, maleic acid, fumaric acid, itaconic acid, and citraconic acid, and more preferably a monomer unit derived from one or more monomers selected from methacrylic acid and acrylic acid.

<11>

The dispersant composition for a hydraulic composition described in any of the above <1> to <10>, wherein the monomer unit of component (B) having a phosphate group is a monomer unit derived from one or more monomers selected from phosphate compounds having an addition-polymerizable unsaturated bond and phosphate compounds having a condensation-polymerizable aromatic functional group; preferably a monomer unit derived from one or more monomers selected from di[(2-hydroxyethyl) methacrylic acid] phosphate ester, di[(2-hydroxyethyl) acrylic acid] phosphate ester, mono(2-hydroxyethyl)methacrylic acid phosphate ester, mono(2-hydroxyethyl)acrylic acid phosphate ester, polyalkylene glycol mono(meth)acrylate acid phosphate ester, and phenoxyethanol phosphate; and more preferably a monomer unit derived from one or more monomers selected from di[(2-hydroxyethyl) methacrylic acid] phosphate ester, mono(2-hydroxyethyl)methacrylic acid phosphate ester, and phenoxyethanol phosphate.

<12>

The dispersant composition for a hydraulic composition described in any of the above <1> to <11>, wherein the monomer unit of component (B) having an alkyleneoxy group is a monomer unit derived from a compound having an addition-polymerizable unsaturated bond and an alkyleneoxy group, preferably a monomer unit derived from one or more monomers selected from alkoxypolyalkylene glycol mono(meth)acrylate, and an ether compound of polyalkylene glycol and an unsaturated alcohol.

<13>

The dispersant composition for a hydraulic composition described in any of the above <1> to <12>, wherein the monomer unit of component (B) having an alkyleneoxy group is a monomer unit derived from a monomer selected from: an esterified product of an acrylic acid or methacrylic acid, and an alkyl-blocked polyalkylene glycol such as methoxypolyethylene glycol, methoxypolyethylene polypropylene glycol, ethoxypolyethylene glycol, ethoxypolyethylene polypropylene glycol, propoxypolyethylene glycol, propoxypolyethylene polypropylene glycol; an adduct of ethyleneoxide and/or propylene oxide of allyl alcohol; an adduct of ethyleneoxide and/or propylene oxide of isoprenol; an adduct of ethyleneoxide and/or propylene oxide of vinyl alcohol; an adduct of ethyleneoxide and/or propylene oxide of acrylic acid; and an adduct of ethyleneoxide and/or propylene oxide of methacrylic acid.

<14>

The dispersant composition for a hydraulic composition described in any of the above <1> to <13>, wherein the monomer unit of component (B) having an alkyleneoxy group has an average number of moles of added alkyleneoxy group per monomer unit of preferably 5 or more, more preferably 7 or more, and further preferably 20 or more; and preferably 150 or less, and more preferably 130 or less.

<15>

The dispersant composition for a hydraulic composition described in any of the above <1> to <14>, wherein the monomer unit of component (B) having an alkyleneoxy group is a monomer unit derived from a monomer represented by the following general formula (B1).

[Chemical formula 9]

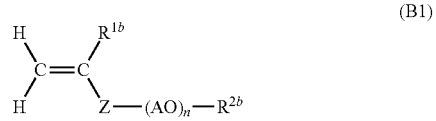

(B1)

wherein R$^{1b}$ represents a hydrogen atom or a methyl group; AO is an alkyleneoxy group having 2 or 3 carbon atoms, n is an average number of AO moles added and represents a number of 5 or more and 150 or less; Z represents an ether group (—O—) or an ester group (—COO—); and R$^{2b}$ represents a hydrogen atom or an alkyl group having a carbon number of 1 or more and 3 or less.

<16>

The dispersant composition for a hydraulic composition described in any of the above <1> to <15>, wherein component (B) is a polymer selected from a polymer containing a monomer unit having a carboxylic acid group and a polymer containing a monomer unit having a carboxylic acid group and a monomer unit having a phosphate group.

<17>

The dispersant composition for a hydraulic composition described in any of the above <1> to <16>, wherein component (B) is one or more polymers selected from the following (b1), (b2) and (b3):

(b1) polymer containing, as constituent monomers, methacrylic acid and methoxy polyethylene glycol monomethacrylate, preferably wherein the polymer contains, as constituent monomers, methacrylic acid and methoxy polyethylene glycol monomethacrylate, methacrylic acid constitutes 40 mol % or more and 90 mol % or less of the constituent monomers, methoxy polyethylene glycol monomethacrylate constitutes 10 mol % or more and 60 mol % or less of the constituent monomers, and the polymer has a weight average molecular weight of 10,000 or more and 100,000 or less;

(b2) formaldehyde condensation polymer containing, as constituent monomers, polyoxyethylene monophenyl ether and phenoxyethanol phosphate, preferably wherein the polymer contains, as constituent monomers, polyoxyethylene monophenyl ether and phenoxyethanol phosphate, polyoxyethylene monophenyl ether constitutes 10 mol % or more and 70 mol % or less of the constituent monomers, phenoxyethanol phosphate constitutes 30 mol % or more and 90 mol % or less of the constituent monomers, and the polymer has a weight average molecular weight of 5,000 or more and 100,000 or less; and (b3) polymer containing, as constituent monomers, methacrylic acid and 2-hydroxyethyl acrylate, preferably wherein the polymer contains, as constituent monomers, methacrylic acid and 2-hydroxyethyl acrylate, methacrylic acid constitutes 45 mol % or more and 95 mol % or less of the constituent monomers, 2-hydroxyethyl acrylate constitutes 5 mol % or more and 55 mol % or less of the constituent monomers, and the polymer has a weight average molecular weight of 5,000 or more and 100,000 or less.

<18>
The dispersant composition for a hydraulic composition described in any of the above <1> to <17>, wherein component (B) has a weight average molecular weight of preferably 5,000 or more, more preferably 10,000 or more, and further preferably 30,000 or more; and preferably 500,000 or less, further preferably 150,000 or less, and further more preferably 100,000 or less.

<19>
The dispersant composition for a hydraulic composition described in any of the above <1> to <18>, wherein the dispersant composition for a hydraulic composition contains, in the solid content thereof, component (B) in an amount of preferably 1 mass % or more, more preferably 3 mass % or more, and further preferably 5 mass % or more; and preferably 95 mass % or less, more preferably 90 mass % or less, and further preferably 80 mass % or less.

<20>
The dispersant composition for a hydraulic composition described in any of the above <1> to <19>, wherein the mass ratio between components (A) and (B), (A)/(B), is preferably 0.01 or more, more preferably 0.05 or more, further preferably 0.1 or more, further more preferably 0.3 or more, further more preferably 1.0 or more, and further more preferably 3.0 or more; and preferably 100 or less, more preferably 55 or less, further preferably 10 or less, and further more preferably 5 or less.

<21>
The dispersant composition for a hydraulic composition described in any of the above <1> to <20>, wherein a compound in the form of $R^{11}$—H in which $R^{11}$ is $R^{11}$ in the general formula (C1) has an HLB of preferably 3.21 or less, more preferably 1.31 or less, further preferably −0.59 or less; and preferably −3.46 or more, more preferably −2.51 or more, and further preferably −1.56 or more.

<22>
The dispersant composition for a hydraulic composition described in any of the above <1> to <21>, wherein: a compound in the form of $R^{21}$—H in which $R^{21}$ is $R^{21}$ in the general formula (C2); a compound in the form of $R^{31}$—H in which $R^{31}$ is $R^{31}$ in the general formula (C3); and a compound in the form of $R^{41}$—H in which $R^{41}$ is $R^{41}$ in the general formula (C4) have HLBs which are the same or different, each of which being preferably 3.21 or less, and more preferably 1.31 or less; and preferably −3.46 or more, more preferably −2.51 or more, further preferably −1.56 or more, and further more preferably −0.60 or more.

<23>
The dispersant composition for a hydraulic composition described in any of the above <1> to <22>, wherein $R^{11}$ in the general formula (C1), $R^{21}$ in the general formula (C2), $R^{31}$ in the general formula (C3) and $R^{41}$ in the general formula (C4) are the same or different, and each is a group selected from hydrocarbon groups selected from an alkyl group, an alkenyl group, an aralkyl group, an aryl group, and an aryl group having a substituent (hereinafter, referred to as substituted aryl group), preferably a group selected from an alkyl group, alkenyl group and substituted aryl group.

<24>
The dispersant composition for a hydraulic composition described in any of the above <1> to <23>, wherein the carbon number of $R^{11}$ in the general formula (C1) is preferably 8 or more, more preferably 12 or more, and further preferably 16 or more; and preferably 22 or less, more preferably 20 or less, and further preferably 18 or less.

<25>
The dispersant composition for a hydraulic composition described in any of the above <1> to <24>, wherein the carbon number of $R^{21}$ in the general formula (C2) is preferably 8 or more, more preferably 12 or more, and further preferably 16 or more; and preferably 22 or less, more preferably 20 or less, and further preferably 18 or less.

<26>
The dispersant composition for a hydraulic composition described in any of the above <1> to <25>, wherein the carbon number of $R^{31}$ in the general formula (C3) is preferably 8 or more, more preferably 12 or more, and further preferably 16 or more; and preferably 22 or less, more preferably 20 or less, and further preferably 18 or less.

<27>
The dispersant composition for a hydraulic composition described in any of the above <1> to <26>, wherein the carbon number of $R^{41}$ in the general formula (C4) is preferably 8 or more, more preferably 12 or more, and further preferably 16 or more; and preferably 22 or less, more preferably 20 or less, and further preferably 18 or less.

<28>
The dispersant composition for a hydraulic composition described in any of the above <1> to <27>, wherein $R^{11}$ in the general formula (C1), $R^{21}$ in the general formula (C2), $R^{31}$ in the general formula (C3) and $R^{41}$ in the general formula (C4) are the same or different, and each is an alkyl group or an alkenyl group, preferably an aliphatic alkyl group or an aliphatic alkenyl group, more preferably a linear aliphatic alkyl group or a linear aliphatic alkenyl group, and further preferably a linear primary aliphatic alkyl group or a linear primary aliphatic alkenyl group.

<29>
The dispersant composition for a hydraulic composition described in any of the above <1> to <28>, wherein $R^{11}$ in the general formula (C1) and $R^{21}$ in the general formula (C2) are the same or different, and each is a group selected from: an alkyl or alkenyl group with a carbon number of preferably 10 or more, and further preferably 12 or more; and preferably 22 or less, and further preferably 20 or less, and a group wherein a hydrogen atom of the alkyl or alkenyl group is substituted by a substituent; and a hydrocarbon group-substituted phenyl group.

<30>

The dispersant composition for a hydraulic composition described in any of the above <1> to <29>, wherein $R^{11}$ in the general formula (C1) and $R^{21}$ in the general formula (C2) are the same or different, and each is a group selected from:

an alkyl group, preferably an aliphatic alkyl group, more preferably a linear aliphatic alkyl group, and further preferably a linear primary aliphatic alkyl group, having a carbon number of preferably 10 or more and further preferably 12 or more, and preferably 22 or less and further preferably 20 or less;

an alkenyl group, preferably an aliphatic alkenyl group, more preferably a linear aliphatic alkenyl group, and further preferably a linear primary aliphatic alkenyl group, having a carbon number of preferably 10 or more and further preferably 12 or more, and preferably 22 or less and further preferably 20 or less;

an alkyl group-substituted phenyl group having a carbon number of preferably 1 or more, and further preferably 2 or more; and preferably 10 or less, and further preferably 8 or less;

a benzyl group-substituted phenyl group; and a styrenated phenyl group, having.

<31>

The dispersant composition for a hydraulic composition described in any of the above <1> to <30>, wherein $R^{11}$ in the general formula (C1), $R^{21}$ in the general formula (C2), $R^{31}$ in the general formula (O3) and $R^{41}$ in the general formula (C4) are the same or different, and each is a hydrocarbon group selected from a decyl group, a lauryl group, a myristyl group, a palmityl group, a stearyl group, a behenyl group, an isostearyl group, an oleyl group, a tribenzyl phenyl group, a distyrenated phenyl group and a tristyrenated phenyl group; preferably a lauryl group, a myristyl group, a palmityl group, a stearyl group, a behenyl group, an isostearyl group, an oleyl group, a tribenzyl phenyl group and a distyrenated phenyl group; and more preferably a lauryl group, a myristyl group, a palmityl group, a stearyl group, an oleyl group, a tribenzyl phenyl group and a distyrenated phenyl group.

<32>

The dispersant composition for a hydraulic composition described in any of the above <1> to <31>, wherein X in the general formula (C1) is O.

<33>

The dispersant composition for a hydraulic composition described in any of the above <1> to <32>, wherein X in the general formula (C2) is O.

<34>

The dispersant composition for a hydraulic composition described in any of the above <1> to <33>, wherein $R^{22}$ in the general formula (C2) is a hydrogen atom.

<35>

The dispersant composition for a hydraulic composition described in any of the above <1> to <34>, wherein AOs in the general formulas (C1), (C2), (C3) and (C4) are the same or different, and each is an alkyleneoxy group having 2 or 3 carbon atoms, or includes an alkyleneoxy group having 2 carbon atoms.

<36>

The dispersant composition for a hydraulic composition described in any of the above <1> to <35>, wherein n1 in the general formula (C1) is preferably 1 or more, more preferably 10 or more, further preferably 20 or more, further more preferably 30 or more, further more preferably 40 or more, and further more preferably 50 or more; and preferably 200 or less, more preferably 150 or less, and further preferably 100 or less.

<37>

The dispersant composition for a hydraulic composition described in any of the above <1> to <36>, wherein n2 in the general formula (C2) is preferably 5 or more, more preferably 9 or more, further preferably 12 or more, further more preferably 20 or more, and further more preferably 28 or more; and preferably 200 or less, more preferably 150 or less, further preferably 100 or less, further more preferably 60, and further more preferably 35 or less.

<38>

The dispersant composition for a hydraulic composition described in any of the above <1> to <37>, wherein the total of n3 and n4 in the general formula (C3) is 1 or more, preferably 20 or more, and more preferably 50 or more; and 300 or less, preferably 200 or less, and more preferably 150 or less, and further preferably 100 or less.

<39>

The dispersant composition for a hydraulic composition described in any one of the above <1> to <38>, wherein the total of n5 and n6 in the general formula (C4) is 1 or more, preferably 20 or more, and more preferably 50 or more; and 300 or less, preferably 200 or less, more preferably 150 or less, and further preferably 100 or less.

<40>

The dispersant composition for a hydraulic composition described in any one of the above <1> to <39>, wherein component (C) is one or more compounds selected from (C1) and (C4).

<41>

The dispersant composition for a hydraulic composition described in any one of the above <1> to <40>, wherein component (C) is one or more compounds selected from (C3) and (C4).

<42>

The dispersant composition for a hydraulic composition described in any one of the above <1> to <41>, wherein component (C) is one or more compounds selected from (C1) and (C3).

<43>

The dispersant composition for a hydraulic composition described in any one of the above <1> to <42>, wherein the dispersant composition for a hydraulic composition contains, in the solid content thereof, component (C) in an amount of preferably 2 mass % or more, more preferably 5 mass % or more, and further preferably 7 mass % or more; and preferably 90 mass % or less, more preferably 80 mass % or less, and further preferably 70 mass % or less.

<44>

The dispersant composition for a hydraulic composition described in any one of the above <1> to <43>, wherein the mass ratio between the total of components (A) and (B), and component (C), (C)/[(A)+(B)], is preferably 0.01 or more, more preferably 0.02 or more, further preferably 0.05 or more, further more preferably 0.1 or more, further more preferably 0.3 or more, further more preferably 0.4 or more, and further more preferably 0.6 or more; and preferably 10 or less, more preferably 7 or less, further preferably 5 or less, further more preferably 4 or less, further more preferably 2 or less, further more preferably 1 or less, and further more preferably 0.8 or less.

<45>
The dispersant composition for a hydraulic composition described in any one of the above <1> to <44>, containing (D) an antifoaming agent (hereinafter, referred to as component (D)), preferably a fatty acid ester-based antifoaming agent.

<46>
The dispersant composition for a hydraulic composition described in the above <45>, wherein the dispersant composition for a hydraulic composition contains, in the solid content thereof, component (D) in an amount of preferably 0.001 mass % or more, more preferably 0.01 mass % or more, and further preferably 0.1 mass % or more; and preferably 10 mass % or less, more preferably 5 mass % or less, and further preferably 1 mass % or less.

<47>
The dispersant composition for a hydraulic composition described in the above <45> or <46>, wherein the mass ratio between components (C) and (D), (D)/(C), is preferably 0.00001 or more, more preferably 0.00005 or more, and further preferably 0.0001 or more; and preferably 0.5 or less, more preferably 0.1 or less, and further preferably 0.05 or less.

<48>
The dispersant composition for a hydraulic composition described in any one of the above <1> to <47>, wherein the dispersant composition for a hydraulic composition contains water, and the water content in the composition is preferably 10 mass % or more, more preferably 30 mass % or more, and further preferably 50 mass % or more; and preferably 90 mass % or less, and more preferably 70 mass % or less.

<49>
The dispersant composition for a hydraulic composition described in any one of the above <1> to <48>, wherein the dispersant composition for a hydraulic composition contains water, and the content of component (A) in the composition is preferably 1 mass % or more, more preferably 4 mass % or more, and further preferably 7 mass % or more; and preferably 50 mass % or less, more preferably 32 mass % or less, and further preferably 27 mass % or less.

<50>
The dispersant composition for a hydraulic composition described in any one of the above <1> to <49>, wherein the dispersant composition for a hydraulic composition contains water, and the content of component (B) in the composition is preferably 1 mass % or more, more preferably 4 mass % or more, and further preferably 7 mass % or more; and preferably 60 mass % or less, more preferably 50 mass % or less, and further preferably 32 mass % or less.

<51>
The dispersant composition for a hydraulic composition described in any one of the above <1> to <50>, wherein the dispersant composition for a hydraulic composition contains water, and the content of component (C) in the composition is preferably 1 mass % or more, more preferably 4 mass % or more, and further preferably 7 mass % or more; and preferably 60 mass % or less, more preferably 50 mass % or less, and further preferably 32 mass % or less.

<52>
The dispersant composition for a hydraulic composition described in any one of the above <1> to <51>, wherein the dispersant composition for a hydraulic composition contains water, and the total content of components (A), (B) and (C) in the composition is preferably 10 mass % or more, more preferably 20 mass % or more, and further preferably 30 mass % or more; and preferably 90 mass % or less, more preferably 70 mass % or less, and further preferably 50 mass % or less.

<53>
A hydraulic composition, which contains:
a hydraulic powder;
water;
(A) a high-molecular compound having a naphthalene ring-containing monomer unit;
(B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group; and
(C) one or more compounds selected from a compound represented by the following general formula (C1), a compound represented by the following general formula (C2), a compound represented by the following general formula (C3), and a compound represented by the following general formula (C4),

[Chemical formula 10]

$$R^{11}-X-(AO)_{n1}-SO_3M \quad (C1)$$

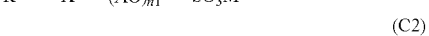

$$R^{21}-X-(AO)_{n2}-R^{22} \quad (C2)$$

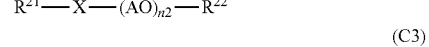

$$R^{31}-N\begin{matrix}(AO)_{n3}-R^{32}\\ \\(AO)_{n4}-R^{33}\end{matrix} \quad (C3)$$

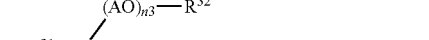

$$R^{41}-N\begin{matrix}(AO)_{n5}-Y^1\\ \\(AO)_{n6}-Y^2\end{matrix} \quad (C4)$$

wherein:
$R^{11}$ is a hydrocarbon group, and a compound in the form of $R^{11}$—H has an HLB of 5.10 or less;
$R^{21}$ is a hydrocarbon group, and a compound in the form of $R^{21}$—H has an HLB of 5.10 or less;
$R^{31}$ is a hydrocarbon group, and a compound in the form of $R^{31}$—H has an HLB of 5.10 or less;
$R^{41}$ is a hydrocarbon group, and a compound in the form of $R^{41}$—H has an HLB of 5.10 or less;
$R^{22}$, $R^{32}$ and $R^{33}$ are the same or different and each represents a hydrogen atom or an alkyl group having a carbon number of 1 or more and 3 or less;
$Y^1$ and $Y^2$ are the same or different, each represents a hydrogen atom or $SO_3M$, and at least one of $Y^1$ and $Y^2$ is $SO_3M$;
AO is an alkyleneoxy group having a carbon number of 2 or more and 4 or less;
$n_1$ represents an average number of AO moles added and is 0 or more and 300 or less;
$n_2$ represents an average number of AO moles added and is 1 or more and 300 or less;
$n_3$ and $n_4$ are the same or different, and each represents an average number of AO moles added and is 0 or more, and a total of $n_3$ and $n_4$ is 1 or more and 300 or less;

$n_5$ and $n_6$ are the same or different; each represents an average number of AO moles added and is 0 or more; a total of $n_5$ and $n_6$ is 1 or more and 300 or less; when $n_5$ is 0, $Y^1$ is a hydrogen atom; and when $n_6$ is 0, $Y^2$ is a hydrogen atom;

X is O or COO; and

M is a counter ion.

<54>

The hydraulic composition described in the above <53>, wherein component (A) is a formaldehyde naphthalenesulfonate condensate or a salt thereof.

<55>

The hydraulic composition described in the above <53> or <54>, wherein component (A) has a weight average molecular weight of preferably 200,000 or less, more preferably 100,000 or less, further preferably 80,000 or less, further more preferably 50,000 or less, and further more preferably 20,000 or less.

<56>

The hydraulic composition described in any one of the above <53> to <55>, wherein component (A) has a weight average molecular weight of preferably 1,000 or more, more preferably 3,000 or more, further preferably 4,000 or more, and further more preferably 5,000 or more.

<57>

The hydraulic composition described in any one of the above <53> to <56>, wherein component (A) has a weight average molecular weight of preferably 200,000 or less, more preferably 100,000 or less, further preferably 80,000 or less, further more preferably 50,000 or less, and further more preferably 20,000 or less; and preferably 1,000 or more, more preferably 3,000 or more, further preferably 4,000 or more, and further more preferably 5,000 or more.

<58>

The hydraulic composition described in any one of the above <53> to <57>, wherein the hydraulic powder is cement or gypsum.

<59>

The hydraulic composition described in any one of the above <53> to <58>, wherein the ratio of water/hydraulic powder is preferably 15 mass % or more, and more preferably 20 mass % or more; and preferably 50 mass % or less, more preferably 45 mass % or less, and further preferably 40 mass % or less.

<60>

The hydraulic composition described in any one of the above <53> to <59>, wherein the hydraulic composition contains component (A) in an amount of preferably 0.01 parts by mass or more, more preferably 0.03 parts by mass or more, further preferably 0.05 parts by mass or more, further more preferably 0.1 parts by mass or more, further more preferably 0.15 parts by mass or more, and further more preferably 0.30 parts by mass or more; and preferably 2 parts by mass or less, more preferably 1.5 parts by mass or less, further preferably 1.0 part by mass or less, and further more preferably 0.80 parts by mass or less, relative to 100 parts by mass of the hydraulic powder.

<61>

The hydraulic composition described in any one of the above <53> to <60>, wherein the hydraulic composition contains component (B) in an amount of preferably 0.005 parts by mass or more, more preferably 0.03 parts by mass or more, further preferably 0.05 parts by mass or more, further more preferably 0.1 parts by mass or more, further more preferably 0.15 parts by mass or more, and further more preferably 0.2 parts by mass or more; and preferably 3 parts by mass or less, more preferably 2 parts by mass or less, further preferably 1.5 parts by mass or less, further more preferably 1.0 part by mass or less, further more preferably 0.7 parts by mass or less, and further more preferably 0.5 parts by mass or less, relative to 100 parts by mass of the hydraulic powder.

<62>

The hydraulic composition described in any one of the above <53> to <61>, wherein the hydraulic composition contains component (C) in an amount of preferably 0.01 parts by mass or more, more preferably 0.02 parts by mass or more, further preferably 0.04 parts by mass or more, further more preferably 0.06 parts by mass or more, further more preferably 0.08 parts by mass or more, further more preferably 0.1 parts by mass or more, and further more preferably 0.3 parts by mass or more; and preferably 2 parts by mass or less, more preferably 1.5 parts by mass or less, further preferably 1.3 parts by mass or less, further more preferably 1 part by mass or less, further more preferably 0.8 parts by mass or less, and further more preferably 0.6 parts by mass or less, relative to 100 parts by mass of the hydraulic powder.

<63>

The hydraulic composition described in any one of the above <53> to <62>, wherein the hydraulic composition contains components (A) and (B) in total in an amount of preferably 0.005 parts by mass or more, more preferably 0.03 parts by mass or more, further preferably 0.1 parts by mass or more, further more preferably 0.15 parts by mass or more, and further more preferably 0.3 parts by mass or more; and preferably 5 parts by mass or less, more preferably 3 parts by mass or less, further preferably 2 parts by mass or less, and further more preferably 1 part by mass or less, relative to 100 parts by mass of the hydraulic powder.

<64>

The hydraulic composition described in any one of the above <53> to <63>, wherein the hydraulic composition contains components (A), (B) and (C) in total in an amount of preferably 0.01 parts by mass or more, more preferably 0.05 parts by mass or more, further preferably 0.1 parts by mas or more, further more preferably 0.14 parts by mass or more, further more preferably 0.20 parts by mass or more, further more preferably 0.40 parts by mass or more, and further more preferably 0.70 parts by mass or more; and preferably 5 parts by mass or less, more preferably 4 parts by mass or less, further preferably 3 parts by mass or less, further more preferably 2 parts by mass or less, and further more preferably 1.5 parts by mass or less, relative to 100 parts by mass of the hydraulic powder.

<65>

The hydraulic composition described in any one of the above <53> to <64>, wherein the mass ratio between components (A) and (B), (A)/(B), is preferably 0.01 or more, more preferably 0.05 or more, further preferably 0.1 or more, further more preferably 0.3 or more, further more preferably 1.0 or more, and further more preferably 3.0 or more; and preferably 100 or less, more preferably 55 or less, further preferably 10 or less, and further more preferably 5 or less.

<66>

The hydraulic composition described in any one of the above <53> to <65>, wherein the mass ratio between the total of components (A) and (B), and component (C), (C)/[(A)+(B)], is preferably 0.01 or more, more preferably 0.02 or more, further preferably 0.05 or more, further more preferably 0.1 or more, further more preferably 0.3 or more, further more preferably 0.4 or more, and further more preferably 0.6 or more; and preferably 10 or less, more preferably 7 or less, further preferably 5 or less, further more preferably 4 or less, further more preferably 2 or less, further more preferably 1 or less, and further more preferably 0.8 or less.

<67>

The hydraulic composition described in any one of the above <53> to <66>, wherein the hydraulic composition contains (D) an antifoaming agent (hereinafter, referred to as component (D)), preferably a fatty-acid ester-based antifoaming agent.

<68>

The hydraulic composition described in the above <67>, wherein the hydraulic composition contains component (D) in an amount of preferably 0.0005 parts by mass or more, more preferably 0.00025 parts by mass or more, further preferably 0.0005 parts by mass or more; and preferably 0.1 parts by mass or less, more preferably 0.075 parts by mass or less, and further preferably 0.05 parts by mass or less, relative to 100 parts by mass of the hydraulic powder.

<69>

The hydraulic composition described in the above <67> or <68>, wherein the mass ratio between components (C) and (D), (D)/(C), is preferably 0.00001 or more, more preferably 0.00005 or more, and further preferably 0.0001 or more; and preferably 0.5 or less, more preferably 0.1 or less, and further preferably 0.05 or less.

<70>

A method for manufacturing a dispersant composition for a hydraulic composition, which includes mixing:

(A) a high-molecular compound having a naphthalene ring-containing monomer unit;

(B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group; and (C) one or more compounds selected from a compound represented by the following general formula (C1), a compound represented by the following general formula (C2), a compound represented by the following general formula (C3), and a compound represented by the following general formula (C4),

[Chemical formula 11]

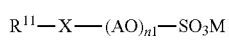 (C1)

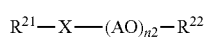 (C2)

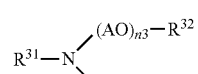 (C3)

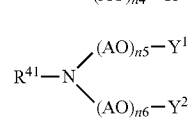 (C4)

wherein:

$R^{11}$ is a hydrocarbon group, and a compound in the form of $R^{11}$—H has an HLB of 5.10 or less;

$R^{21}$ is a hydrocarbon group, and a compound in the form of $R^{21}$—H has an HLB of 5.10 or less;

$R^{31}$ is a hydrocarbon group, and a compound in the form of $R^{31}$—H has an HLB of 5.10 or less;

$R^{41}$ is a hydrocarbon group, and a compound in the form of $R^{41}$—H has an HLB of 5.10 or less;

$R^{22}$, $R^{32}$ and $R^{33}$ are the same or different and each represents a hydrogen atom or an alkyl group having a carbon number of 1 or more and 3 or less;

$Y^1$ and $Y^2$ are the same or different, each represents a hydrogen atom or $SO_3M$, and at least one of $Y^1$ and $Y^2$ is $SO_3M$;

AO is an alkyleneoxy group having a carbon number of 2 or more and 4 or less;

$n_1$ represents an average number of AO moles added and is 0 or more and 300 or less;

$n_2$ represents an average number of AO moles added and is 1 or more and 300 or less;

$n_3$ and $n_4$ are the same or different, and each represents an average number of AO moles added and is 0 or more, and a total of $n_3$ and $n_4$ is 1 or more and 300 or less;

$n_5$ and $n_6$ are the same or different; each represents an average number of AO moles added and is 0 or more; a total of $n_5$ and $n_6$ is 1 or more and 300 or less; when $n_5$ is 0, $Y^1$ is a hydrogen atom; and when $n_6$ is 0, $Y^2$ is a hydrogen atom;

X is O or COO; and

M is a counter ion.

<71>

A method for manufacturing a hydraulic composition, which includes mixing:

a hydraulic powder;

water;

(A) a high-molecular compound having a naphthalene ring-containing monomer unit;

(B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group; and (C) one or more compounds selected from a compound represented by the following general formula (C1), a compound represented by the following general formula (C2), a compound represented by the following general formula (C3), and a compound represented by the following general formula (C4),

[Chemical formula 12]

 (C1)

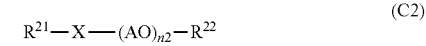 (C2)

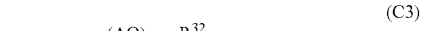 (C3)

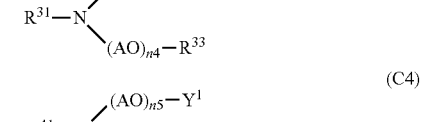 (C4)

wherein:

$R^{11}$ is a hydrocarbon group, and a compound in the form of $R^{11}$—H has an HLB of 5.10 or less;

$R^{21}$ is a hydrocarbon group, and a compound in the form of $R^{21}$—H has an HLB of 5.10 or less;

$R^{31}$ is a hydrocarbon group, and a compound in the form of $R^{31}$—H has an HLB of 5.10 or less;

$R^{41}$ is a hydrocarbon group, and a compound in the form of $R^{41}$—H has an HLB of 5.10 or less;

$R^{22}$, $R^{32}$ and $R^{33}$ are the same or different and each represents a hydrogen atom or an alkyl group having a carbon number of 1 or more and 3 or less;

$Y^1$ and $Y^2$ are the same or different, each represents a hydrogen atom or $SO_3M$, and at least one of $Y^1$ and $Y^2$ is $SO_3M$;

AO is an alkyleneoxy group having a carbon number of 2 or more and 4 or less;

$n_1$ represents an average number of AO moles added and is 0 or more and 300 or less;

$n_2$ represents an average number of AO moles added and is 1 or more and 300 or less;

$n_3$ and $n_4$ are the same or different, and each represents an average number of AO moles added and is 0 or more, and a total of $n_3$ and $n_4$ is 1 or more and 300 or less;

$n_5$ and $n_6$ are the same or different; each represents an average number of AO moles added and is 0 or more; a total of $n_5$ and $n_6$ is 1 or more and 300 or less; when $n_5$ is 0, $Y^1$ is a hydrogen atom; and when $n_6$ is 0, $Y^2$ is a hydrogen atom;

X is O or COO; and

M is a counter ion.

<72>

In preparing a hydraulic composition by mixing: a hydraulic powder, water, (A) a high-molecular compound having a naphthalene ring-containing monomer unit, and (B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group, a method for improving dispersing performance of (A) and (B) for the hydraulic powder, which includes adding (C) one or more compounds selected from a compound represented by the following general formula (C1), a compound represented by the following general formula (C2), a compound represented by the following general formula (C3), and a compound represented by the following general formula (C4),

[Chemical formula 13]

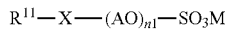  (C1)

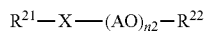  (C2)

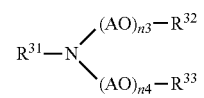  (C3)

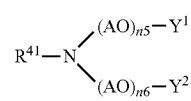  (C4)

wherein:

$R^{11}$ is a hydrocarbon group, and a compound in the form of $R^{11}$—H has an HLB of 5.10 or less;

$R^{21}$ is a hydrocarbon group, and a compound in the form of $R^{21}$—H has an HLB of 5.10 or less;

$R^{31}$ is a hydrocarbon group, and a compound in the form of $R^{31}$—H has an HLB of 5.10 or less;

$R^{41}$ is a hydrocarbon group, and a compound in the form of $R^{41}$—H has an HLB of 5.10 or less;

$R^{22}$, $R^{32}$ and $R^{33}$ are the same or different and each represents a hydrogen atom or an alkyl group having a carbon number of 1 or more and 3 or less;

$Y^1$ and $Y^2$ are the same or different, each represents a hydrogen atom or $SO_3M$, and at least one of $Y^1$ and $Y^2$ is $SO_3M$;

AO is an alkyleneoxy group having a carbon number of 2 or more and 4 or less;

$n_1$ represents an average number of AO moles added and is 0 or more and 300 or less;

$n_2$ represents an average number of AO moles added and is 1 or more and 300 or less;

$n_3$ and $n_4$ are the same or different, and each represents an average number of AO moles added and is 0 or more, and a total of $n_3$ and $n_4$ is 1 or more and 300 or less;

$n_5$ and $n_6$ are the same or different; each represents an average number of AO moles added and is 0 or more; a total of $n_5$ and $n_6$ is 1 or more and 300 or less; when $n_5$ is 0, $Y^1$ is a hydrogen atom; and when $n_6$ is 0, $Y^2$ is a hydrogen atom;

X is O or COO; and

M is a counter ion.

<73>

Use of a dispersant composition for a hydraulic composition described in any one of the above <1> to <52>, as a dispersant for a hydraulic composition, further a dispersant for a hydraulic composition containing a hydraulic powder and water.

<74>

A dispersant composition for a hydraulic composition described in any one of the above <1> to <52>, which is used for a dispersant for a hydraulic composition, further a dispersant for a hydraulic composition containing a hydraulic powder and water.

<75>

Use of a composition described in any one of the above <53> to <69>, as a hydraulic composition.

<76>

A composition described in any one of the above <53> to <69>, which is used for a hydraulic composition.

<77>

A hydraulic composition for an inorganic powder, containing:

(A) a high-molecular compound having a naphthalene ring-containing monomer unit;

(B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group; and (C) one or more compounds selected from a compound represented by the following general formula (C1), a compound represented by the following general formula (C2), a compound represented by the following general formula (C3), and a compound represented by the following general formula (C4),

[Chemical formula 14]

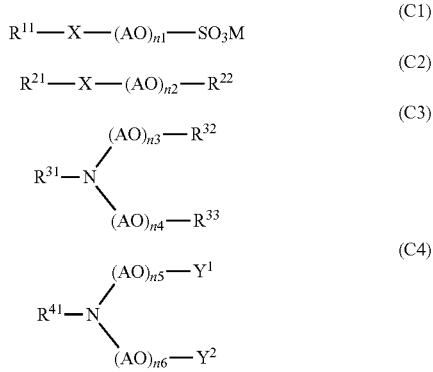

(C1) $R^{11}\text{---}X\text{---}(AO)_{n1}\text{---}SO_3M$ (C2) $R^{21}\text{---}X\text{---}(AO)_{n2}\text{---}R^{22}$ (C3) $R^{31}\text{---}N\begin{cases}(AO)_{n3}\text{---}R^{32}\\(AO)_{n4}\text{---}R^{33}\end{cases}$ (C4) $R^{41}\text{---}N\begin{cases}(AO)_{n5}\text{---}Y^1\\(AO)_{n6}\text{---}Y^2\end{cases}$ wherein:

$R^{11}$ is a hydrocarbon group, and a compound in the form of $R^{11}$—H has an HLB of 5.10 or less;

$R^{21}$ is a hydrocarbon group, and a compound in the form of $R^{21}$—H has an HLB of 5.10 or less;

$R^{31}$ is a hydrocarbon group, and a compound in the form of $R^{31}$—H has an HLB of 5.10 or less;

$R^{41}$ is a hydrocarbon group, and a compound in the form of $R^{41}$—H has an HLB of 5.10 or less;

$R^{22}$, $R^{32}$ and $R^{33}$ are the same or different and each represents a hydrogen atom or an alkyl group having a carbon number of 1 or more and 3 or less;

$Y^1$ and $Y^2$ are the same or different, each represents a hydrogen atom or $SO_3M$, and at least one of $Y^1$ and $Y^2$ is $SO_3M$;

AO is an alkyleneoxy group having a carbon number of 2 or more and 4 or less;

$n_1$ represents an average number of AO moles added and is 0 or more and 300 or less;

$n_2$ represents an average number of AO moles added and is 1 or more and 300 or less;

$n_3$ and $n_4$ are the same or different, and each represents an average number of AO moles added and is 0 or more, and a total of $n_3$ and $n_4$ is 1 or more and 300 or less;

$n_5$ and $n_6$ are the same or different; each represents an average number of AO moles added and is 0 or more; a total of $n_5$ and $n_6$ is 1 or more and 300 or less; when $n_5$ is 0, $Y^1$ is a hydrogen atom; and when $n_6$ is 0, $Y^2$ is a hydrogen atom;

X is O or COO; and

M is a counter ion.

EXAMPLES

Example 1 and Comparative Example 1

(1) Preparation of Mortar

Into a mortar mixer (universal mixing stirrer, model: 5DM-03-γ manufactured by Dalton Corporation), a cement (C) and a fine aggregate (S) were fed and dry-mixed for 10 seconds at a low speed rotation (63 rpm) of the mortar mixer, and then mixing water (W) containing components (A), (B) and (C) and an antifoaming agent was added. Then, the mixture was subjected to main kneading for 120 seconds at a low speed rotation (63 rpm) of the mortar mixer, so that a mortar at 22° C. or 33° C. was prepared. The 22° C. mortar was prepared at room temperature of 22° C. (the temperature of the mixer was 22° C.) by use of cement, fine aggregate and water, all having a temperature of 22° C. The 33° C. mortar was prepared in a thermostatic chamber at 33° C. by use of a mixer, cement, fine aggregate and water, all having a temperature of 33° C.

Blending conditions for the mortars for both temperatures: 400 g of cement, 700 g of fine aggregate, and water/cement ratio (W/C)=35 mass %

Components used are as follows. Note that a compound having an ethyleneoxy group is expressed with a number in parentheses, which indicates an average number of moles of added ethylene oxide (the same is applied to other examples and comparative examples). POE of component (C) is an abbreviation of polyoxyethylene, and a number in parentheses indicates an average number of moles of added ethylene oxide (the same is applied to other examples and comparative examples).

Water (W): water from public water supply system

Cement (C): ordinary portland cement (mixture of two types: Taiheiyo Cement Corporation/Sumitomo Osaka Cement Co., Ltd=1/1, mass ratio), density: 3.16 g/cm³

Fine aggregate (S): pit sand from Joyo area, density: 2.55 g/cm³

Component (A): sodium salt of a formaldehyde naphthalenesulfonate condensate, weight average molecular weight: 15000

Component (B): copolymer of sodium salt of methacrylic acid/methoxy polyethylene glycol (23) monomethacrylate (molar ratio: 70/30, weight average molecular weight=50000)

Component (C): POE (26) oleyl ether [which is a compound represented by the general formula (C2), wherein $R^{21}$ is an oleyl group, $R^{22}$ is a hydrogen atom, X is O, AO is an ethyleneoxy group, $n_2$ is 26, and a compound in the form of $R^{21}$—H has an HLB of −1.55]

Antifoaming agent: Foamlex 797 (fatty acid ester-based antifoaming agent), manufactured by Nicca Chemical Co., Ltd., was added in an amount of 0.05 g for the above mortar blending.

(2) Evaluation of Fluidity

In accordance with the test method of JIS R 5201, the flow of the prepared mortar was measured. It should be noted that no operation for falling motion was conducted. The flow measurement was conducted on the 22° C.- and 33° C.-mortars. Results are shown in Tables 1 and 2.

TABLE 1

| | | Component (A) Added amount*¹ (part by mass) | Component (B) Added amount*¹ (part by mass) | Component (C) Added amount*¹ (part by mass) | Total added amount*² (part by mass) | Mortar flow (mm) | Mortar Temp. (° C.) | Ratio of added amount*³ |
|---|---|---|---|---|---|---|---|---|
| Comparative Examples | 1-1 | 0.603 | — | — | 0.603 | 200 | 22 | Reference |
| | | 0.532 | — | — | 0.532 | 200 | 33 | 88% |
| | 1-2 | — | 0.174 | — | 0.174 | 200 | 22 | Reference |
| | | — | 0.186 | — | 0.186 | 200 | 33 | 107% |
| | 1-3 | 0.55 | 0.160 | — | 0.710 | 116 | 22 | — |
| | 1-4 | 1.10 | 0.320 | — | 1.420 | 120 | 22 | — |

TABLE 1-continued

| | | Component (A) Added amount*[1] (part by mass) | Component (B) Added amount*[1] (part by mass) | Component (C) Added amount*[1] (part by mass) | Total added amount*[2] (part by mass) | Mortar flow (mm) | Mortar Temp. (° C.) | Ratio of added amount*[3] |
|---|---|---|---|---|---|---|---|---|
| Example | 1-1 | 0.606 | 0.176 | 0.110 | 0.893 | 200 | 22 | Reference |
| | | 0.607 | 0.177 | 0.110 | 0.894 | 200 | 33 | 100% |

*[1]Added amount: added amount (part by mass) relative to 100 parts by mass of cement
*[2]Total added amount: total added amount (part by mass) of components (A), (B) and (C), relative to 100 parts by mass of cement
*[3]Ratio of added amounts: a relative value (mass %) of added amount, when the required added amount at 22° C. is taken as 100 mass %

From Comparative Example 1-1, it is found that the added amount of component (A) required for obtaining a predetermined fluidity (200 mm) is decreased at a mortar temperature of 33° C. compared to at a mortar temperature of 22° C.

From Comparative Example 1-2, it is found that the added amount of component (B) required for obtaining the predetermined fluidity is increased at a mortar temperature of 33° C. compared to at a mortar temperature of 22° C.

However, from Comparative Examples 1-3 and 1-4, it is found that when components (A) and (B) are used simply in combination, the fluidity is largely decreased at a mortar temperature of 22° C., and the predetermined fluidity cannot be obtained.

In contrast, in Example 1-1 where components (A), (B) and (C) are used in combination, no decrease in the fluidity occurs at mortar temperatures of 22° C. and 33° C., and the added amounts required for the predetermined fluidity are almost the same.

It should be noted that in Comparative Examples 1-3 and 1-4, the fluidity of the mortar is largely decreased even at a mortar temperature of 33° C., and the predetermined fluidity is not obtained though not shown in the table.

fluidity is exhibited at mortar temperatures of 22° C. and 33° when the components are added in the same amounts.

It should be noted that the dispersant composition for a hydraulic composition of the present invention can be obtained by mixing components (A), (B) and (C) corresponding to Example 1-1 in Table 1 or Example 1-2 in Table 2 with water. In this case, the dispersant composition for a hydraulic composition contains components (A), (B) and (C), and water. In the composition, the content of component (A) may be set to 20 to 40 mass %. Components (B) and (C) are used in amounts corresponding to a mass ratio to the above amount of component (A). The amount of water to be used is set so that the entire of the composition is 100 mass %. Such a one-part composition provides good stability, and addition of components (A), (B) and (C) in the same amounts as shown in Table 1 relative to cement can provide a good mortar flow.

Example 2 and Comparative Example 2

Mortars were prepared in the same manner as in Example 1, and the fluidity and the compressive strength of a hardened mortar product were evaluated. It should be noted that

TABLE 2

| | | Component (A) Added amount*[1] (part by mass) | Component (B) Added amount*[1] (part by mass) | Component (C) Added amount*[1] (part by mass) | Total added amount*[2] (part by mass) | Mortar flow (mm) | Mortar Temp. (° C.) | Mortar flow ratio*[3] |
|---|---|---|---|---|---|---|---|---|
| Comparative Examples | 1-5 | 0.600 | — | — | 0.600 | 196 | 22 | Reference |
| | | 0.600 | — | — | 0.600 | 256 | 33 | 130.6% |
| | 1-6 | — | 0.180 | — | 0.180 | 215 | 22 | Reference |
| | | — | 0.180 | — | 0.180 | 187 | 33 | 87.0% |
| Example | 1-2 | 0.600 | 0.180 | 0.110 | 0.89 | 200 | 22 | Reference |
| | | 0.600 | 0.180 | 0.110 | 0.89 | 201 | 33 | 100.5% |

*[1]Added amount: added amount (part by mass) relative to 100 parts by mass of cement
*[2]Total added amount: total added amount (part by mass) of components (A), (B) and (C), relative to 100 parts by mass of cement
*[3]Mortar flow ratio: a relative value (%) of mortar flow when the mortar flow at 22° C. is taken as 100%

From Comparative Example 1-5, it is found that when the same amount of component (A) is added, an increased mortar flow is exhibited at a mortar temperature of 33° C. compared to at a mortar temperature of 22° C.

From Comparative Example 1-6, it is found that when the same amount of component (B) is added, a lower mortar flow is exhibited at a mortar temperature of 33° compared to at a mortar temperature of 22° C.

In contrast, it is found that in Example 1-2 where components (A), (B) and (C) are combined, almost the same the fluidity was evaluated for the 22° C. mortar. Further, as component (C), an ammonium salt of POE (60) oleyl ether sulfuric ester was used. This compound as component (C) is represented by the general formula (C1), wherein $R^{11}$ is an oleyl group, X is O, AO is an ethyleneoxy group, n1 is 60, M is an ammonium ion, and a compound in the form of $R^{11}$—H has an HLB of −1.55. In addition, the evaluation of compressive strength (which was observed after atmospheric curing at 10° C. for 18 hours) was made by a strength testing machine CONCRETO 2000 manufactured by Shimadzu Corporation. Results are shown in Table 3.

TABLE 3

|  |  | Component (A) Added amount*1 (part by mass) | Component (B) Added amount*1 (part by mass) | Component (C) Added amount*1 (part by mass) | Total added amount*2 (part by mass) | Mortar flow (mm) | Compressive strength (N/mm$^2$) |
|---|---|---|---|---|---|---|---|
| Comparative Examples | 2-1 | 0.6 | — | — | 0.600 | 185 | 2.32 |
|  | 2-2 | — | 0.16 | — | 0.160 | 191 | 1.85 |
|  | 2-3 | 0.6 | 0.16 | — | 0.760 | 123 | 0.78 |
|  | 2-4 | 0.138 | — | 0.138 | 0.276 | 104 | 4.26 |
|  | 2-5 | — | 0.040 | 0.138 | 0.178 | 100 | 3.31 |
|  | 2-6 | 0.138 | 0.040 | — | 0.178 | 100 | 2.85 |
| Example | 2-1 | 0.138 | 0.040 | 0.138 | 0.316 | 200 | 3.07 |

*1Added amount: added amount (part by mass) relative to 100 parts by mass of cement
*2Total added amount: total added amount (part by mass) of components (A), (B) and (C), relative to 100 parts by mass of cement From Comparative Examples 2-1 to 2-2, it is found that when a dispersant is added so that the mortar flow is within 180 to 200 mm, single use of component (A) or (B) is less likely to provide compressive strength.

From Comparative Example 2-3, it is found that even combination of components (A) and (B) fails to provide a good mortar flow, and the compressive strength is also extremely decreased.

From Example 2-1, it is found that combination of components (A), (B) and (C) provides a good mortar flow and has an improved compressive strength compared to single use of a dispersant.

From Comparative Examples 2-4 to 2-5, it is found that even when component (C) is used in combination with component (A) or (B) in an amount equivalent to that of Example 2-1, a good mortar flow is not obtained.

From Comparative Example 2-6, it is found that when component (C) is removed from Example 2-1, a good mortar flow is not obtained.

Example 3 and Comparative Example 3

Mortars were prepared in the same manner as in Example 1, and the fluidity was evaluated. It should be noted that the fluidity was evaluated for the 22° C. mortar. Further, as component (C), those listed in Tables 4 and 5 were used. Results are shown in Tables 4 and 5.

TABLE 4

|  |  | Component (A) Added amount*1 (part by mass) | Component (B) Added amount*1 (part by mass) | Component (C) Type |
|---|---|---|---|---|
| Comparative Examples | 3-1 | 0.550 | — | — |
|  | 3-2 | — | 0.160 | — |
|  | 3-3 | 0.550 | 0.160 | — |
|  | 3-4 | 0.550 | 0.160 | Oleyl alcohol |
|  | 3-5 | 0.550 | 0.160 | POE(2)propyl ether |
|  | 3-6 | 0.550 | 0.160 | Sodium salt of ethyl alcohol sulfuric ester |
| Examples | 3-1 | 0.550 | 0.160 | Ammonium salt of POE(30) oleyl ether sulfuric ester |
|  | 3-2 | 0.550 | 0.160 | Ammonium salt of POE(30) oleyl ether sulfuric ester |
|  | 3-3 | 0.550 | 0.160 | Ammonium salt of POE(30) oleyl ether sulfuric ester |
|  | 3-4 | 0.550 | 0.160 | Ammonium salt of POE(30) oleyl ether sulfuric ester |
|  | 3-5 | 0.550 | 0.160 | Ammonium salt of POE(30) oleyl ether sulfuric ester |
|  | 3-6 | 0.550 | 0.160 | Ammonium salt of POE(30) oleyl ether sulfuric ester |
|  | 3-7 | 0.550 | 0.160 | Ammonium salt of POE(30) oleyl ether sulfuric ester |
|  | 3-8 | 0.550 | 0.160 | Ammonium salt of POE(30) oleyl ether sulfuric ester |
|  | 3-9 | 0.550 | 0.160 | Ammonium salt of POE(30) oleyl ether sulfuric ester |
|  | 3-10 | 0.550 | 0.160 | Ammonium salt of POE(30) oleyl ether sulfuric ester |
|  | 3-11 | 0.550 | 0.160 | Ammonium salt of POE(120) oleyl ether sulfuric ester |
|  | 3-12 | 0.550 | 0.160 | Ammonium salt of POE(47) lauryl ether sulfuric ester |

|  |  | Component (C) General formula | Component (C) HLB of R-H*2 | Component (C) Added amount*1 (part by mass) | (A)/(C) (mass ratio) | (C)/[(A) + (B)] (mass ratio) | Total added amount*3 (part by mass) | Mortar flow (mm) |
|---|---|---|---|---|---|---|---|---|
| Comparative Examples | 3-1 | — | — | — | — | — | 0.550 | 187 |
|  | 3-2 | — | — | — | — | — | 0.160 | 192 |
|  | 3-3 | — | — | — | — | — | 0.710 | 120 |
|  | 3-4 | — | −1.55 | 0.250 | 2.200 | — | 0.960 | 110 |
|  | 3-5 | — | 5.56 | 0.150 | 3.667 | — | 0.860 | 119 |
|  | 3-6 | — | 6.05 | 0.200 | 2.750 | — | 0.910 | 111 |
| Examples | 3-1 | (C1) | −1.55 | 0.020 | 27.500 | 0.028 | 0.730 | 125 |
|  | 3-2 |  | −1.55 | 0.050 | 11.000 | 0.070 | 0.760 | 153 |
|  | 3-3 |  | −1.55 | 0.100 | 5.500 | 0.141 | 0.810 | 225 |
|  | 3-4 |  | −1.55 | 0.150 | 3.667 | 0.211 | 0.860 | 294 |
|  | 3-5 |  | −1.55 | 0.250 | 2.200 | 0.352 | 0.960 | 307 |
|  | 3-6 |  | −1.55 | 0.500 | 1.100 | 0.704 | 1.210 | 305 |
|  | 3-7 |  | −1.55 | 0.700 | 0.786 | 0.986 | 1.410 | 307 |
|  | 3-8 |  | −1.55 | 1.000 | 0.550 | 1.408 | 1.710 | 294 |
|  | 3-9 |  | −1.55 | 2.000 | 0.275 | 2.817 | 2.710 | 245 |

TABLE 4-continued

|   |   |   |   |   |   |   |
|---|---|---|---|---|---|---|
| 3-10 | −1.55 | 3.000 | 0.183 | 4.225 | 3.710 | 195 |
| 3-11 | −1.55 | 0.600 | 0.917 | 0.845 | 1.310 | 308 |
| 3-12 | 1.30 | 0.600 | 0.917 | 0.845 | 1.310 | 295 |

TABLE 5

|   |   | Component (A) | Component (B) | Component (C) | | | |
|---|---|---|---|---|---|---|---|
|   |   | Added amount*1 (part by mass) | Added amount*1 (part by mass) | Type |   | General formula | HLB of R-H*2 |
| Examples | 3-13 | 0.550 | 0.160 | POE(30) behenyl ether |   | (C2) | −3.45 |
|   | 3-14 | 0.550 | 0.160 | POE(150) oleyl ether |   |   | −1.55 |
|   | 3-15 | 0.550 | 0.160 | POE(30) oleyl ether |   |   | −1.55 |
|   | 3-16 | 0.550 | 0.160 | POE(47) lauryl ether |   |   | 1.30 |
|   | 3-17 | 0.550 | 0.160 | POE(13.5) oleyl ether |   |   | −1.55 |
|   | 3-18 | 0.550 | 0.160 | POE(7) oleyl ether |   |   | −1.55 |
|   | 3-19 | 0.550 | 0.160 | POE(7) oleyl ether |   |   | −1.55 |
|   | 3-20 | 0.550 | 0.160 | POE(5) oleyl ether |   |   | −1.55 |
|   | 3-21 | 0.550 | 0.160 | POE(9) oleyl ether |   |   | −1.55 |
|   | 3-22 | 0.550 | 0.160 | POE(2) lauryl ether |   |   | 1.30 |
|   | 3-23 | 0.550 | 0.160 | POE(2) lauryl ether |   |   | 1.30 |
|   | 3-24 | 0.550 | 0.160 | POE(23) lauryl ether |   |   | 1.30 |
|   | 3-25 | 0.550 | 0.160 | POE(10) decyl ether |   |   | 2.25 |
|   | 3-26 | 0.550 | 0.160 | POE(11) 2-ethylhexyl ether |   |   | 3.20 |
|   | 3-27 | 0.550 | 0.160 | POE(14) tribenzylphenyl ether |   |   | −5.83 |
|   | 3-28 | 0.550 | 0.160 | POE(19) distyrenated phenyl ether |   |   | −3.45 |
|   | 3-29 | 0.550 | 0.160 | Ammonium salt of POE(13) distyrenated phenyl ether sulfuric ester |   | (C1) | −3.45 |
|   | 3-30 | 0.550 | 0.160 | Ammonium salt of POE(13) distyrenated phenyl ether sulfuric ester |   |   | −3.45 |
|   | 3-31 | 0.550 | 0.160 | Ammonium salt of POE(13) distyrenated phenyl ether sulfuric ester |   |   | −3.45 |
|   | 3-32 | 0.550 | 0.160 | Ammonium salt of POE(13) distyrenated phenyl ether sulfuric ester |   |   | −3.45 |
|   | 3-33 | 0.550 | 0.160 | POE(30) monostearate |   | (C2) | −1.55 |
|   | 3-34 | 0.550 | 0.160 | Ammonium salt of POE(30) 2-ethylhexyl ether sulfuric ester |   | (C1) | 3.20 |
|   | 3-35 | 0.550 | 0.160 | Sodium salt of oleyl alcohol sulfuric ester |   |   | −1.55 |
|   | 3-36 | 0.550 | 0.160 | Sodium salt of lauryl alcohol sulfuric ester |   |   | 1.30 |
|   | 3-37 | 0.550 | 0.160 | Sodium salt of decyl alcohol sulfuric ester |   |   | 2.25 |
|   | 3-38 | 0.550 | 0.160 | POE(2) butyl ether |   | (C2) | 5.10 |
|   | 3-39 | 0.550 | 0.160 | POE(2) butyl ether |   |   | 5.10 |
|   | 3-40 | 0.550 | 0.160 | POE(2) hexyl ether |   |   | 4.15 |
|   | 3-41 | 0.550 | 0.160 | POE(2) hexyl ether |   |   | 4.15 |
|   | 3-42 | 0.550 | 0.160 | Beef tallow amine EO(40) adduct |   | (C3) | −1.55 |
|   | 3-43 | 0.550 | 0.160 | Ammonium salt of beef tallow amine EO(40) adduct sulfuric ester |   | (C4) | −1.55 |

|   |   | Component (C) Added amount*1 (part by mass) | (A)/(C) (mass ratio) | (C)/[(A) + (B)] (mass ratio) | Total added amount*3 (part by mass) | Mortar flow (mm) |
|---|---|---|---|---|---|---|
| Examples | 3-13 | 0.300 | 1.833 | 0.423 | 1.010 | 236 |
|   | 3-14 | 1.080 | 0.509 | 1.521 | 1.790 | 307 |
|   | 3-15 | 0.250 | 2.200 | 0.352 | 0.960 | 301 |
|   | 3-16 | 0.540 | 1.019 | 0.761 | 1.250 | 300 |
|   | 3-17 | 0.100 | 5.500 | 0.141 | 0.810 | 245 |
|   | 3-18 | 0.090 | 6.111 | 0.127 | 0.800 | 182 |
|   | 3-19 | 0.150 | 3.667 | 0.211 | 0.860 | 248 |
|   | 3-20 | 1.000 | 0.550 | 1.408 | 1.710 | 200 |
|   | 3-21 | 0.100 | 5.500 | 0.141 | 0.810 | 200 |
|   | 3-22 | 0.070 | 7.857 | 0.099 | 0.780 | 148 |
|   | 3-23 | 0.200 | 2.750 | 0.282 | 0.910 | 173 |
|   | 3-24 | 0.270 | 2.037 | 0.380 | 0.980 | 292 |
|   | 3-25 | 0.390 | 1.410 | 0.549 | 1.100 | 289 |
|   | 3-26 | 0.270 | 2.037 | 0.380 | 0.980 | 280 |
|   | 3-27 | 0.300 | 1.833 | 0.423 | 1.010 | 165 |
|   | 3-28 | 0.300 | 1.833 | 0.423 | 1.010 | 240 |
|   | 3-29 | 0.300 | 1.833 | 0.423 | 1.010 | 280 |
|   | 3-30 | 0.200 | 2.750 | 0.282 | 0.910 | 180 |
|   | 3-31 | 0.150 | 3.667 | 0.211 | 0.860 | 153 |
|   | 3-32 | 0.100 | 5.500 | 0.141 | 0.810 | 130 |
|   | 3-33 | 0.250 | 2.200 | 0.352 | 0.960 | 298 |
|   | 3-34 | 0.680 | 0.809 | 0.958 | 1.390 | 295 |
|   | 3-35 | 0.250 | 2.200 | 0.352 | 0.960 | 137 |
|   | 3-36 | 0.200 | 2.750 | 0.282 | 0.910 | 185 |

TABLE 5-continued

| | | | | | |
|---|---|---|---|---|---|
| 3-37 | 0.073 | 7.534 | 0.103 | 0.783 | 135 |
| 3-38 | 0.110 | 5.000 | 0.155 | 0.820 | 136 |
| 3-39 | 0.800 | 0.688 | 1.127 | 1.510 | 179 |
| 3-40 | 0.130 | 4.231 | 0.183 | 0.840 | 155 |
| 3-41 | 0.300 | 1.833 | 0.423 | 1.010 | 219 |
| 3-42 | 0.200 | 2.750 | 0.282 | 0.910 | 290 |
| 3-43 | 0.200 | 2.750 | 0.282 | 0.910 | 300 |

*[1] Added amount: added amount (part by mass) relative to 100 parts by mass of cement
*[2] HLB of R-H: HLB by Davies' method on a compound corresponding to $R^{11}$-H, a compound corresponding to $R^{21}$-H, a compound corresponding to $R^{31}$-H, a compound corresponding to $R^{41}$-H, octadecene, propane, or ethane
*[3] Total added amount: total added amount (part by mass) of components (A), (B) and (C), relative to 100 parts by mass of cement From Comparative Examples 3-1 to 3-3, it is found that combined use of components (A) and (B) causes a remarkable decrease of mortar flow. It should be noted that Comparative Examples 3-1 and 3-2 exhibit a compressive strength lower than all of Examples though not shown in Table 4.

From Examples 3-1 to 3-43, it is found that addition of component (C) improves the mortar flow compared to Comparative Example 3-3 where components (A) and (B) are used in combination.

Example 4 and Comparative Example 4

Mortars were prepared in the same manner as in Example 1, and the fluidity was evaluated. It should be noted that the fluidity was evaluated for the 22° C. mortar. Further, as component (B), those shown below were used. In addition, as component (C), an ammonium salt of POE (60) oleyl ether sulfuric ester or an ammonium salt of POE (30) oleyl ether sulfuric ester was used. The ammonium salt of POE (60) oleyl ether sulfuric ester is represented by the general formula (C1), wherein $R^{11}$ is an oleyl group, X is O, AO is an ethyleneoxy group, n1 is 60, M is an ammonium ion, and a compound in the form of $R^{11}$—H has an HLB of −1.55. Further, the ammonium salt of POE (30) oleyl ether sulfuric ester is represented by the general formula (C1), wherein $R^{11}$ is an oleyl group, X is O, AO is an ethyleneoxy group, n1 is 30, M is an ammonium ion, and a compound in the form of $R^{11}$—H has an HLB of −1.55. Results are shown in Table 6.

* Component (B) used herein
B-1 to B-4 were manufactured by referring to the manufacturing method in Examples of JP-B 2774445.
- B-1: copolymer of a sodium salt of methacrylic acid/methoxy polyethylene glycol (9) monomethacrylate=60/40 (molar ratio) (Mw 50000)
- B-2: copolymer of a sodium salt of methacrylic acid/methoxy polyethylene glycol (23) monomethacrylate=70/30 (molar ratio) (Mw 50000)
- B-3: copolymer of a sodium salt of methacrylic acid/methoxy polyethylene glycol (120) monomethacrylate=85/15 (molar ratio) (Mw 70000)
- B-4: copolymer of 2-(methacryloyloxy) ethyl phosphate/methoxy polyethylene glycol (23) monomethacrylate=60/40 (molar ratio) (Mw 40000)
- B-5: condensation polymer, obtained by the method in "Preparation 2 of condensation polymer of the present invention" in JP-T 2008-517080, of poly(ethylene oxide) monophenyl ether (2000 g/mol), phenoxyethanol phosphate (mixture of 2-phenoxyethanol dihydrogen phosphate and 2-phenoxyethanol hydrogen phosphate), and formaldehyde (20000 g/mol)

TABLE 6

| | | Component (A) Added amount*[1] | Component (B) | |
|---|---|---|---|---|
| | | (part by mass) | Sign | Type |
| Comparative Examples | 4-1 | 0.550 | — | — |
| | 4-2 | — | B-1 | Copolymer of a sodium salt of methacrylic acid/methoxy polyethylene glycol (9) monomethacrylate |
| | 4-3 | — | B-2 | Copolymer of a sodium salt of methacrylic acid/methoxy polyethylene glycol (23) monomethacrylate |
| | 4-4 | — | B-3 | Copolymer of a sodium salt of methacrylic acid/methoxy polyethylene glycol (120) monomethacrylate |
| | 4-5 | — | B-4 | Copolymer of 2-(methacryloyloxy) ethyl phosphate/methoxy polyethylene glycol (23) monomethacrylate |
| | 4-4 | — | B-5 | Condensation polymer of poly(ethylene oxide) monophenyl ether/phenoxyethanol phosphate/formaldehyde |
| | 4-6 | 0.550 | B-1 | Copolymer of a sodium salt of methacrylic acid/methoxy polyethylene glycol (9) monomethacrylate |
| | 4-7 | 0.550 | B-2 | Copolymer of a sodium salt of methacrylic acid/methoxy polyethylene glycol (23) monomethacrylate |
| | 4-8 | 0.550 | B-3 | Copolymer of a sodium salt of methacrylic acid/methoxy polyethylene glycol (120) monomethacrylate |
| | 4-9 | 0.550 | B-4 | Copolymer of 2-(methacryloyloxy) ethyl phosphate/methoxy polyethylene glycol (23) monomethacrylate |
| | 4-10 | 0.550 | B-5 | Condensation polymer of poly(ethylene oxide) monophenyl ether/phenoxyethanol phosphate/formaldehyde |
| Examples | 4-1 | 0.550 | B-1 | Copolymer of a sodium salt of methacrylic acid/methoxy polyethylene glycol (9) monomethacrylate |
| | 4-2 | 0.550 | B-2 | Copolymer of a sodium salt of methacrylic acid/methoxy polyethylene glycol (23) monomethacrylate |
| | 4-3 | 0.550 | B-3 | Copolymer of a sodium salt of methacrylic acid/methoxy polyethylene glycol (120) monomethacrylate |
| | 4-4 | 0.550 | B-4 | Copolymer of 2-(methacryloyloxy) ethyl phosphate/methoxy polyethylene glycol (23) monomethacrylate |

TABLE 6-continued

| | | | |
|---|---|---|---|
| 4-3 | 0.550 | B-5 | Condensation polymer of poly(ethylene oxide) monophenyl ether/phenoxyethanol phosphate/formaldehyde |

| | | Component (B) | Component (C) | | Total added amount*[2] | |
|---|---|---|---|---|---|---|
| | | Added amount*[1] (part by mass) | Type | Added amount*[1] (part by mass) | (part by mass) | Mortar flow (mm) |
| Comparative Examples | 4-1 | — | — | — | 0.550 | 169 |
| | 4-2 | 0.250 | — | — | 0.250 | 195 |
| | 4-3 | 0.160 | — | — | 0.160 | 172 |
| | 4-4 | 0.160 | — | — | 0.160 | 208 |
| | 4-5 | 0.200 | — | — | 0.200 | 178 |
| | 4-4 | 0.200 | — | — | 0.200 | 169 |
| | 4-6 | 0.250 | — | — | 0.800 | 106 |
| | 4-7 | 0.160 | — | — | 0.710 | 110 |
| | 4-8 | 0.160 | — | — | 0.710 | 105 |
| | 4-9 | 0.200 | — | — | 0.750 | 113 |
| | 4-10 | 0.200 | — | — | 0.750 | 110 |
| Examples | 4-1 | 0.250 | Ammonium salt of POE(60) oleyl ether sulfuric ester | 0.550 | 1.350 | 305 |
| | 4-2 | 0.160 | Ammonium salt of POE(30) oleyl ether sulfuric ester | 0.280 | 0.990 | 310 |
| | 4-3 | 0.160 | Ammonium salt of POE(30) oleyl ether sulfuric ester | 0.280 | 0.990 | 310 |
| | 4-4 | 0.200 | Ammonium salt of POE(60) oleyl ether sulfuric ester | 0.550 | 1.300 | 304 |
| | 4-3 | 0.200 | Ammonium salt of POE(30) oleyl ether sulfuric ester | 0.280 | 1.030 | 300 |

*[1]Added amount: added amount (part by mass) relative to 100 parts by mass of cement
*[2]Total added amount: total added amount (part by mass) of components (A), (B) and (C), relative to 100 parts by mass of cement From Comparative Examples 4-6 to 4-10, it is found that combined use of components (A) and (B) causes a remarkable decrease of mortar flow.

From Examples 4-1 to 4-5, it is found that addition of component (C) markedly improves the mortar flow compared to Comparative Examples 4-6 to 4-10 where components (A) and (B) are used in combination.

Comparative Example 5

Mortars were prepared in the same manner as in Example 1, and the fluidity was evaluated. However, instead of component (C), calcium formate was added to mixing water (W) and the mortars were prepared. Further, the fluidity was evaluated for the 22° C. mortar. Results are shown in Table 7. In Table 7, results of Example 2-1 and Comparative Examples 2-1 to 2-6 are also shown.

From Comparative Examples 5-1 and 5-2, it is found that calcium formate is unable to improve a decrease of mortar flow caused by combined use of components (A) and (B).

Example 6 and Comparative Example 6

Mortars were prepared in the same manner in Example 1, and the fluidity was evaluated. Note that added amounts of components (A), (B) and (C) are as shown in Table 8. Further, the fluidity was evaluated for the 22° C. mortar. Results are shown in Table 8.

TABLE 7

| | | Component (A) Added amount*[1] (part by mass) | Component (B) Added amount*[1] (part by mass) | Component (C) Added amount*[1] (part by mass) | Calcium formate Added amount*[1] (part by mass) | Total added amount*[2] (part by mass) | Mortar flow (mm) |
|---|---|---|---|---|---|---|---|
| Comparative Examples | 5-1 | 0.55 | 0.16 | — | 0.3 | 1.01 | 111 |
| | 5-2 | 0.08 | 0.16 | — | 0.8 | 1.04 | 100 |
| Comparative Examples | 2-1 | 0.6 | — | — | — | 0.600 | 185 |
| | 2-2 | — | 0.16 | — | — | 0.160 | 191 |
| | 2-3 | 0.6 | 0.16 | — | — | 0.760 | 123 |
| | 2-4 | 0.138 | — | 0.138 | — | 0.276 | 104 |
| | 2-5 | — | 0.040 | 0.138 | — | 0.178 | 100 |
| | 2-6 | 0.138 | 0.040 | — | — | 0.178 | 100 |
| Examples | 2-1 | 0.138 | 0.040 | 0.138 | — | 0.316 | 200 |

*[1]Added amount: added amount (part by mass) relative to 100 parts by mass of cement
*[2]Total added amount: total added amount (part by mass) of component (A), component (B), and component (C) or calcium formate, relative to 100 parts by mass of cement

TABLE 8

|  |  | Component (A) Added amount*1 (part by mass) | Component (B) Added amount*1 (part by mass) | Component (C) Added amount*1 (part by mass) | (A)/(B) (mass ratio) | (C)/[(A) + (B)] (mass ratio) | Total added amount*2 (part by mass) | Mortar flow (mm) |
|---|---|---|---|---|---|---|---|---|
| Comparative | 6-1 | 0.55 | — | — | — | — | 0.55 | 171 |
| Examples | 6-2 | — | 0.16 | — | — | — | 0.16 | 163 |
|  | 6-3 | 0.16 | 0.16 | — | 1.00 | — | 0.32 | 110 |
|  | 6-4 | 0.05 | 0.16 | — | 0.31 | — | 0.21 | 113 |
|  | 6-5 | 0.01 | 0.16 | — | 0.06 | — | 0.17 | 149 |
|  | 6-6 | 0.55 | 0.16 | — | 3.44 | — | 0.71 | 116 |
|  | 6-7 | 0.55 | 0.01 | — | 55.00 | — | 0.65 | 138 |
| Examples | 6-1 | 0.16 | 0.16 | 0.16 | 1.00 | 0.50 | 0.48 | 300 |
|  | 6-2 | 0.05 | 0.16 | 0.05 | 0.31 | 0.24 | 0.26 | 256 |
|  | 6-3 | 0.01 | 0.16 | 0.01 | 0.06 | 0.06 | 0.18 | 202 |
|  | 6-4 | 0.55 | 0.16 | 0.55 | 3.44 | 0.77 | 1.26 | 311 |
|  | 6-5 | 0.55 | 0.01 | 0.55 | 55.00 | 0.98 | 1.11 | 310 |

*1Added amount: added amount (part by mass) relative to 100 parts by mass of cement
*2Total added amount: total added amount (part by mass) of components (A), (B) and (C), relative to 100 parts by mass of cement From Examples 6-1 to 6-5, it is found that even when components (A) and (B) are used in combination at different mass ratios, component (C) is able to improve the mortar flow.

Example 7 and Comparative Example 7

22° C. mortars were prepared in the same manner as in Example 1, and the fluidity was evaluated after a predetermined period of kneading. The first time when cement and kneading water were in contact with each other by adding the kneading water (W) to a mortar mixer was taken as the commencement of kneading.

Results are shown in Table 10.

Mortar blending is shown in Table 9. Cement (C), fine aggregate (S), water (W) and an antifoaming agent used for a mortar were the same as in Example 1.

Added amounts of components (A), (B) and (C) are shown in Table 10. Further, the following components were used as components (A), (B) and (C).

Component (A): sodium salt of a formaldehyde naphthalenesulfonate condensate, weight average molecular weight: 15000

Component (B): copolymer of 2-hydroxyethyl acrylate/methoxy polyethylene glycol (23) monomethacrylate (molar ratio 82/18, weight average molecular weight 2000)

Component (C): POE (60) oleyl ether [which is a compound represented by the general formula (C2), wherein $R^{21}$ is an oleyl group, $R^{22}$ is a hydrogen atom, X is O, AO is an ethyleneoxy group, n2 is 60, and a compound in the form of $R^{21}$—H has an HLB of −1.55]

TABLE 9

| W/C | Blended amount (g) | | |
|---|---|---|---|
| (mass %) | W | C | S |
| 40% | 160 | 400 | 700 |

TABLE 10

|  |  | Component (A) Added amount*1 (part by mass) | Component (B) Added amount*1 (part by mass) | Component (C) Added amount*1 (part by mass) | Total added amount*2 (part by mass) | Mortar flow (mm) | | |
|---|---|---|---|---|---|---|---|---|
|  |  |  |  |  |  | 2.5 min. after kneading | 30 min. after kneading | 60 min. after kneading |
| Comparative | 7-1 | 0.5 | — | — | 0.5 | 197 | 135 | 116 |
| Examples | 7-2 | 0.145 | — | 0.145 | 0.29 | 195 | 110 | 105 |
|  | 7-3 | — | 0.07 | — | 0.07 | 100 | 100 | 100 |
| Example | 7-1 | 0.14 | 0.07 | 0.14 | 0.35 | 197 | 162 | 183 |

*1Added amount: added amount (part by mass) relative to 100 parts by mass of cement
*2Total added amount: total added amount (part by mass) of components (A), (B) and (C), relative to 100 parts by mass of cement Comparative Examples 7-1 and 7-2 have a large decrease of mortar flow over time, and are unable to provide a sufficient serviceable life.

Comparative Example 7-3 has a small mortar flow when 2.5 minutes pass after kneading, and is unable to provide the initial fluidity.

Example 7-1 exhibits small fluctuations of mortar flow over time, and is able to provide a sufficient serviceable life.

The invention claimed is:

1. A dispersant composition for a hydraulic composition, comprising:
   (A) a compound having a weight average molecular weight of 1,000 or more and 200,000 or less and having a naphthalene ring-containing monomer unit;
   (B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group; and
   (C) one or more compounds selected from a compound represented by the following general formula (C1), a compound represented by the following general formula (C2), a compound represented by the following general formula (C3), and a compound represented by the following general formula (C4), wherein the dispersant composition for a hydraulic composition contains, in a solid content thereof, (A) in an amount of 1 mass % or more and 99 mass % or less; has a mass ratio between (A) and (B), (A)/(B), of 0.01 or more and 100 or less; and has a mass ratio between a total of (A) and (B), and (C), (C)/[(A)+(B)], of 0.01 or more and 10 or less,

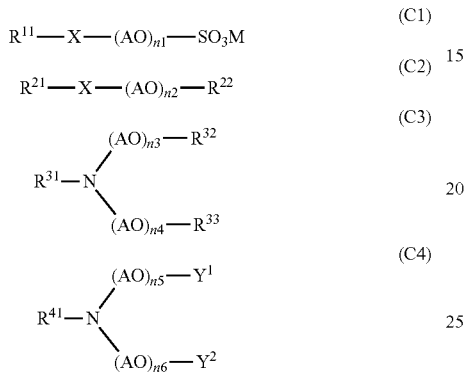

wherein:
$R^{11}$ is a hydrocarbon group, and a compound in the form of $R^{11}$—H has an HLB of 5.10 or less;
$R^{21}$ is a hydrocarbon group, and a compound in the form of $R^{21}$—H has an HLB of 5.10 or less;
$R^{31}$ is a hydrocarbon group, and a compound in the form of $R^{31}$—H has an HLB of 5.10 or less;
$R^{41}$ is a hydrocarbon group, and a compound in the form of $R^{41}$—H has an HLB of 5.10 or less;
$R^{22}$, $R^{32}$ and $R^{33}$ are the same or different and each represents a hydrogen atom or an alkyl group having a carbon number of 1 or more and 3 or less;
$Y^1$ and $Y^2$ are the same or different, each represents a hydrogen atom or $SO_3M$, and at least one of $Y^1$ and $Y^2$ is $SO_3M$;
AO is an alkyleneoxy group having a carbon number of 2 or more and 4 or less;
n1 represents an average number of AO moles added and is 0 or more and 300 or less;
n2 represents an average number of AO moles added and is 1 or more and 300 or less;
n3 and n4 are the same or different, and each represents an average number of AO moles added and is 0 or more, and a total of n3 and n4 is 1 or more and 300 or less;
n5 and n6 are the same or different; each represents an average number of AO moles added and is 0 or more; a total of n5 and n6 is 1 or more and 300 or less; when n5 is 0, $Y^1$ is a hydrogen atom; and when n6 is 0, $Y^2$ is a hydrogen atom;
X is O or COO; and
M is a counter ion.

2. The dispersant composition for a hydraulic composition according to claim 1, further comprising (D) an antifoaming agent.

3. The dispersant composition for a hydraulic composition according to claim 2, which contains, in the solid content thereof, (D) in an amount of 0.001 mass % or more and 10 mass % or less.

4. The dispersant composition for a hydraulic composition according to claim 1, wherein (A) is a formaldehyde naphthalenesulfonate condensate or a salt thereof.

5. A hydraulic composition comprising:
a hydraulic powder;
water;
(A) a compound having a weight average molecular weight of 1,000 or more and 200,000 or less and having a naphthalene ring-containing monomer unit;
(B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group; and
(C) one or more compounds selected from a compound represented by the following general formula (C1), a compound represented by the following general formula (C2), a compound represented by the following general formula (C3), and a compound represented by the following general formula (C4),
wherein the hydraulic composition contains (A) in an amount of 0.01 parts by mass or more and 2 parts by mass or less relative to 100 parts by mass of the hydraulic powder;
has a mass ratio between (A) and (B), (A)/(B), of 0.01 or more and 100 or less; and
has a mass ratio between a total of (A) and (B), and (C), (C)/[(A)+(B)], of 0.01 or more and 10 or less,

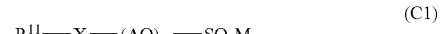
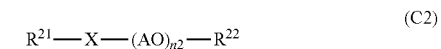

wherein:
$R^{11}$ is a hydrocarbon group, and a compound in the form of $R^{11}$—H has an HLB of 5.10 or less;
$R^{21}$ is a hydrocarbon group, and a compound in the form of $R^{21}$—H has an HLB of 5.10 or less;
$R^{31}$ is a hydrocarbon group, and a compound in the form of $R^{31}$—H has an HLB of 5.10 or less;
$R^{41}$ is a hydrocarbon group, and a compound in the form of $R^{41}$—H has an HLB of 5.10 or less;
$R^{22}$, $R^{32}$ and $R^{33}$ are the same or different and each represents a hydrogen atom or an alkyl group having a carbon number of 1 or more and 3 or less;
$Y^1$ and $Y^2$ are the same or different, each represents a hydrogen atom or $SO_3M$, and at least one of $Y^1$ and $Y^2$ is $SO_3M$;
AO is an alkyleneoxy group having a carbon number of 2 or more and 4 or less;

n1 represents an average number of AO moles added and is 0 or more and 300 or less;

n2 represents an average number of AO moles added and is 1 or more and 300 or less;

n3 and n4 are the same or different, and each represents an average number of AO moles added and is 0 or more, and a total of n3 and n4 is 1 or more and 300 or less;

n5 and n6 are the same or different; each represents an average number of AO moles added and is 0 or more; a total of n5 and n6 is 1 or more and 300 or less; when n5 is 0, $Y^1$ is a hydrogen atom; and when n6 is 0, $Y^2$ is a hydrogen atom;

X is O or COO; and

M is a counter ion.

6. The hydraulic composition according to claim 5, further comprising (D) an antifoaming agent.

7. The hydraulic composition according to claim 6, which contains (D) in an amount of 0.0005 parts by mass or more and 0.1 parts by mass or less relative to 100 parts by mass of the hydraulic powder.

8. The hydraulic composition according to claim 5, wherein (A) is a formaldehyde naphthalenesulfonate condensate or a salt thereof.

9. A method for manufacturing a hydraulic composition, which comprises mixing:
a hydraulic powder;
water;
(A) a compound having a weight average molecular weight of 1,000 or more and 200,000 or less and having a naphthalene ring-containing monomer unit;
(B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group; and
(C) one or more compounds selected from a compound represented by the following general formula (C1), a compound represented by the following general formula (C2), a compound represented by the following general formula (C3), and a compound represented by the following general formula (C4),
wherein the method includes mixing (A) in an amount of 0.01 parts by mass or more and 2 parts by mass or less relative to 100 parts by mass of the hydraulic powder;
mixing (A) and (B) in a mass ratio (A)/(B) of 0.01 or more and 100 or less; and
mixing (A), (B) and (C) in a mass ratio between a total of (A) and (B), and (C), (C)/[(A)+(B)], of 0.01 or more and 10 or less,

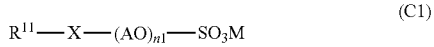 (C1)

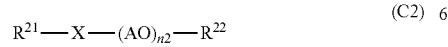 (C2)

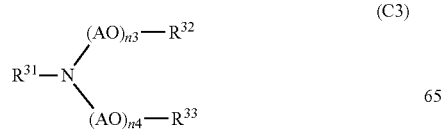 (C3)

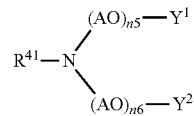 (C4)

wherein:

$R^{11}$ is a hydrocarbon group, and a compound in the form of $R^{11}$—H has an HLB of 5.10 or less;

$R^{21}$ is a hydrocarbon group, and a compound in the form of $R^{21}$—H has an HLB of 5.10 or less;

$R^{31}$ is a hydrocarbon group, and a compound in the form of $R^{31}$—H has an HLB of 5.10 or less;

$R^{41}$ is a hydrocarbon group, and a compound in the form of $R^{41}$—H has an HLB of 5.10 or less;

$R^{22}$, $R^{32}$ and $R^{33}$ are the same or different and each represents a hydrogen atom or an alkyl group having a carbon number of 1 or more and 3 or less;

$Y^1$ and $Y^2$ are the same or different, each represents a hydrogen atom or $SO_3M$, and at least one of $Y^1$ and $Y^2$ is $SO_3M$;

AO is an alkyleneoxy group having a carbon number of 2 or more and 4 or less;

n1 represents an average number of AO moles added and is 0 or more and 300 or less;

n2 represents an average number of AO moles added and is 1 or more and 300 or less;

n3 and n4 are the same or different, and each represents an average number of AO moles added and is 0 or more, and a total of n3 and n4 is 1 or more and 300 or less;

n5 and n6 are the same or different; each represents an average number of AO moles added and is 0 or more; a total of n5 and n6 is 1 or more and 300 or less; when n5 is 0, $Y^1$ is a hydrogen atom; and when n6 is 0, $Y^2$ is a hydrogen atom;

X is O or COO; and

M is a counter ion.

10. The method for manufacturing a hydraulic composition according to claim 9, further comprising mixing (D) an antifoaming agent.

11. The method for manufacturing a hydraulic composition according to claim 10, which includes mixing (D) in an amount of 0.0005 parts by mass or more and 0.1 parts by mass or less relative to 100 parts by mass of the hydraulic powder.

12. The method for manufacturing a hydraulic composition according to claim 9, wherein (A) is a formaldehyde naphthalenesulfonate condensate or a salt thereof.

13. A method for manufacturing a dispersant composition for a hydraulic composition, which comprises mixing:
(A) a compound having a weight average molecular weight of 1,000 or more and 200,000 or less and having a naphthalene ring-containing monomer unit;
(B) a polymer having a weight average molecular weight of 1,000 or more and 1,000,000 or less, and having: a monomer unit having a group selected from a carboxylic acid group, a phosphate group, a group that changes to a carboxylic acid group by hydrolysis, and a group that changes to a phosphate group by hydrolysis; and a monomer unit having an alkyleneoxy group; and
(C) one or more compounds selected from a compound represented by the following general formula (C1), a compound represented by the following general formula (C2), a compound represented by the following general formula (C3), and a compound represented by the following general formula (C4), wherein the method includes mixing (A) in an amount of 1 mass % or more and 99 mass % or less in a solid content of the dispersant composition for a hydraulic composition;

mixing (A) and (B) in a mass ratio (A)/(B) of 0.01 or more and 100 or less; and mixing (A), (B) and (C) in a mass ratio between a total of (A) and (B), and (C), (C)/[(A)+(B)], of 0.01 or more and 10 or less,

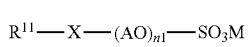 (C1)

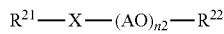 (C2)

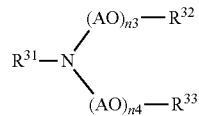 (C3)

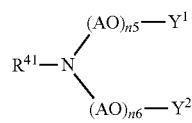 (C4)

wherein:

$R^{11}$ is a hydrocarbon group, and a compound in the form of $R^{11}$—H has an HLB of 5.10 or less;

$R^{21}$ is a hydrocarbon group, and a compound in the form of $R^{21}$—H has an HLB of 5.10 or less;

$R^{31}$ is a hydrocarbon group, and a compound in the form of $R^{31}$—H has an HLB of 5.10 or less;

$R^{41}$ is a hydrocarbon group, and a compound in the form of $R^{41}$—H has an HLB of 5.10 or less;

$R^{22}$, $R^{32}$ and $R^{33}$ are the same or different and each represents a hydrogen atom or an alkyl group having a carbon number of 1 or more and 3 or less;

$Y^1$ and $Y^2$ are the same or different, each represents a hydrogen atom or $SO_3M$, and at least one of $Y^1$ and $Y^2$ is $SO_3M$;

AO is an alkyleneoxy group having a carbon number of 2 or more and 4 or less;

n1 represents an average number of AO moles added and is 0 or more and 300 or less;

n2 represents an average number of AO moles added and is 1 or more and 300 or less;

n3 and n4 are the same or different, and each represents an average number of AO moles added and is 0 or more, and a total of n3 and n4 is 1 or more and 300 or less;

n5 and n6 are the same or different; each represents an average number of AO moles added and is 0 or more; a total of n5 and n6 is 1 or more and 300 or less; when n5 is 0, $Y^1$ is a hydrogen atom; and when n6 is 0, $Y^2$ is a hydrogen atom;

X is O or COO; and

M is a counter ion.

14. The method for manufacturing a dispersant composition for a hydraulic composition according to claim 13, further comprising mixing (D) an antifoaming agent.

15. The method for manufacturing a dispersant composition for a hydraulic composition according to claim 14, which includes mixing (D) in an amount of 0.001 mass % or more and 10 mass % or less in the solid content of the dispersant composition for a hydraulic composition.

16. The method for manufacturing a dispersant composition for a hydraulic composition according to claim 13, wherein (A) is a formaldehyde naphthalenesulfonate condensate or a salt thereof.

* * * * *